United States Patent
Yamaguchi et al.

(10) Patent No.: US 6,273,527 B1
(45) Date of Patent: Aug. 14, 2001

(54) ROTARY PUMP WITH BETTER FLUID SEALING STRUCTURE AND BRAKE APPARATUS HAVING SAME

(75) Inventors: Takahiro Yamaguchi, Kariya; Tomoo Harada, Anjo; Takashi Satou, Okazaki; Takeshi Fuchida, Kariya; Hiroyuki Shinkai, Obu; Toshiya Morikawa, Kariya, all of (JP)

(73) Assignee: Denso Corporation, Aichi-Pref (JP)

( * ) Notice: Subject to any disclaimer, the term of this patent is extended or adjusted under 35 U.S.C. 154(b) by 0 days.

(21) Appl. No.: 09/412,315

(22) Filed: Oct. 5, 1999

(30) Foreign Application Priority Data

| Oct. 6, 1998 | (JP) | 10-284227 |
|---|---|---|
| Oct. 6, 1998 | (JP) | 10-284228 |
| Apr. 14, 1999 | (JP) | 11-106911 |
| Aug. 6, 1999 | (JP) | 11-224499 |

(51) Int. Cl.$^7$ .................................................. B60T 8/40
(52) U.S. Cl. .................. 303/116.4; 418/171; 277/361
(58) Field of Search .................. 303/116.4; 418/129, 418/166, 112, 125, 126, 131, 134, 133, 136, 139, 140, 206.6, 218, 149, 190, 55.4; 277/589, 399

(56) References Cited

U.S. PATENT DOCUMENTS

| 3,490,383 | * | 1/1970 | Parrett | 103/130 |
|---|---|---|---|---|
| 3,697,202 | * | 10/1972 | Reinhart et al. | 418/142 |
| 3,802,812 | * | 4/1974 | Ruf | 418/142 |
| 3,809,509 | * | 5/1974 | Lamm | 418/60 |
| 3,844,693 | * | 10/1974 | Chiba et al. | 418/142 |
| 3,844,694 | * | 10/1974 | Lamm | 418/149 |
| 3,891,361 | * | 6/1975 | Miyake et al. | 418/142 |
| 3,976,406 | * | 8/1976 | Sasaki | 418/142 |
| 4,061,447 | * | 12/1977 | Kato | 418/142 |
| 4,225,294 | * | 9/1980 | Kakuwa et al. | 418/142 |
| 4,225,295 | * | 9/1980 | Shimizu et al. | 418/142 |
| 4,226,429 | * | 10/1980 | Sato et al. | 277/96.2 |
| 4,643,438 | * | 2/1987 | Klusowski et al. | 277/81 P |
| 4,824,125 | * | 4/1989 | Eiermann | 277/215 |
| 5,538,409 | * | 7/1996 | Cureton et al. | 418/142 |
| 5,697,678 | * | 12/1997 | Huber | 303/116.4 |
| 5,725,221 | * | 3/1998 | Pekarsky et al. | 277/29 |
| 6,106,250 | * | 8/2000 | Morita et al. | 418/8 |

FOREIGN PATENT DOCUMENTS

| 56-81289 | 7/1981 | (JP) . |
|---|---|---|
| 57-193788 | 11/1982 | (JP) . |
| 59-154878 | 10/1984 | (JP) . |
| 61-10985 | 1/1986 | (JP) . |
| 6-147132 | 5/1994 | (JP) . |

OTHER PUBLICATIONS

Hydraulic & pneumatic pressure handbook. A movable side plate type sealing element is described to seal all over the surface of the rotor.

* cited by examiner

Primary Examiner—Robert J. Oberleitner
Assistant Examiner—Benjamin A. Pezzlo
(74) Attorney, Agent, or Firm—Pillsbury Winthrop LLP

(57) ABSTRACT

In the rotary pump, a sealing member is provided at a clearance between a casing and axial end surfaces of the inner and outer rotors, the sealing member extending from an outer circumference of the outer rotor, via the inner rotor between a drive shaft and a discharge port, to another circumference of the outer rotor so that brake fluid communication from the discharge port to an intake port may be prevented, but the brake fluid communication between the outer circumference of the outer rotor and almost all of teeth gap portions on a discharge port side and, further, between almost all of teeth gap portions on an intake port side and a clearance between the drive shaft and the inner rotor may be allowed.

26 Claims, 14 Drawing Sheets

ROTARY PUMP WITH BETTER FLUID SEALING STRUCTURE AND BRAKE APPARATUS HAVING SAME

CROSS REFERENCE TO RELATED APPLICATION

This application is based upon and claims the benefit of priority of Japanese Patent Applications No. H.10-284227 filed on Oct. 6, 1998, No. H.10-284228 filed on Oct. 6, 1998, No. H.11-106911 filed on Apr. 14, 1999, and No. H. 11-224499 filed on Aug. 6, 1999, the contents of which are incorporated herein by reference.

BACKGROUND OF THE INVENTION

1. Field of the Invention

The present invention relates to a rotary pump with better fluid sealing structure and a brake apparatus having the same. In particular, the present invention is preferably applied to an internal gear pump such as a trochoid pump or the like for brake apparatus for vehicles.

2. Description of Related Art

A rotary pump, for example, an internal gear pump, is comprised of a drive shaft to be driven by a motor, an inner rotor and an outer rotor to be rotated by the drive shaft and a casing for containing the drive shaft and the inner and outer rotors. The inner and outer rotors contained in the casing form a plurality of teeth gap portions constituted by inner teeth portions of the outer rotor and outer teeth portions of the inner rotor which are in mesh with each other. An intake port and a discharge port are disposed on opposite sides of a pump center line passing through the respective rotation axes of the inner and outer rotors.

When the drive shaft is rotated for driving the pump, the inner rotor is rotated with the drive shaft with an axis of the drive shaft and, according to the rotation of the inner rotor, the outer rotor is rotated in a same direction as the inner teeth portions of the outer rotor are in mesh with the outer teeth portions of the inner rotor. As the respective volumes of the teeth gap portions between the inner and outer teeth portions are varied in every turn of the rotating inner and outer rotors, fluid is sucked from the intake port and discharged to the discharge port.

In the pump mentioned above, there is a problem that the fluid is likely to leak from a high pressure side to a low pressure side through various clearances or gaps in the casing, since fluid pressure at the discharge port (hereinafter called discharge pressure) is higher than fluid pressure at the intake port (hereinafter called intake pressure) when the pump is driven.

In more details, the high pressure fluid at the discharge port leaks to the low pressure intake port or a clearance between the drive shaft and the inner rotor through clearances between the casing and axial end surfaces of the inner and outer rotors, to the low pressure intake port through a clearance between the casing and an outer circumference of the outer rotor or to the low pressure intake port through teeth top gaps formed by forcing the meshed inner and outer teeth portions open.

To cope with these problems, it is possible to narrow the clearance between the casing and the axial end surfaces of the inner and outer rotors or to diminish the clearance to such an extent that the casing and the axial end surfaces of the inner and outer rotors are always in direct contact with each other. However, even if the clearance is narrower, it is very difficult to prevent the fluid leakage and the extremely diminished clearance causes a mechanical loss due to the increased contact resistance with the casing.

Further, it has been proposed to arrange a sealing member between the casing and all of the axial end surfaces of the rotors to restrain the fluid leakage. This is also likely to cause a mechanical loss due to the larger contact resistance with the sealing member.

Furthermore, to prevent the fluid leakage from the outer circumference of the outer rotor, it has been proposed to arrange sealing member in recessed portions provided at an inner wall of the casing that faces the outer circumference of the outer rotor. However, it is very difficult to provide the thickness of the sealing member (the thickness in an axial direction of the inner and outer rotors) always equal to that of the casing because of manufacturing dimensional errors of the sealing member on the molding or machining processes thereof. If there exists a clearance between the casing and the sealing member due to the dimensional errors, fluid leaks through the clearance.

SUMMARY OF THE INVENTION

An object of the present invention is to provide a rotary pump having a better fluid sealing construction that the fluid leakage through the clearance between the casing and the axial end surfaces of the inner and outer rotors may be effectively prevented with a sealing member having a limited contact resistance with the casing and the rotors.

Generally, the rotary pump is composed of an outer rotor provided with inner teeth at an inner circumference thereof, an inner rotor provided with outer teeth at an outer circumference thereof, the outer teeth being in mesh with the inner teeth so as to constitute a plurality of teeth gap portions therebetween, a drive shaft fitted to the inner rotor with a clearance between the drive shaft and the inner rotor for rotating the inner rotor together with the drive shaft, a casing provided with a rotor room where the inner and outer rotors are rotatably contained, a center bore communicating with the rotor room in which the drive shaft is rotatably housed and intake and discharge ports communicating respectively with the teeth gap portions, the rotor room having a first closed region between the intake and discharge ports on a side of the teeth gap portion whose volume is largest and a second closed region between the intake and discharge port on a side of the teeth gap portion whose volume is smallest and each of the first and second closed gap regions being operative for holding brake fluid pressure difference between the intake and discharge ports, wherein brake fluid is sucked from the intake port, being compressed through the teeth gap portions and discharged from the discharge port when the drive shaft is driven.

To achieve the above object, in the rotary pump mentioned above, a transverse sealing member is provided at a transverse clearance between the casing and the axial end surfaces of the inner and outer rotors, the transverse sealing member extending from an outer circumference of the outer rotor, via the first closed region, the inner rotor between the drive shaft and the discharge port and the second closed region, to another circumference of the outer rotor so that brake fluid communication through the transverse clearance from the discharge port to the intake port may be prevented, but the brake fluid communication through the transverse clearance between the outer circumference of the outer rotor and almost all of the teeth gap portions on a side of the discharge port and, further, between almost all of the teeth gap portions on a side of the intake port and the clearance between the drive shaft and the inner rotor may be allowed.

Further, it is preferable to provide the transverse sealing member in a manner that brake fluid communication through the transverse clearance between the outer circumference of the outer rotor and at least one of the teeth gap portions on the side of the intake port may be allowed.

Furthermore, it is preferable that the casing is comprised of first and second side plates having respective center bores in which the drive shaft is housed and a center plate having a bore where the inner and outer rotor are contained, the center plate being put between the first and second plates for constituting the rotor room, wherein each of the first and second side plates is provided with grooved portion extending from the outer circumference of the outer rotor, via the first closed region, the inner rotor between the drive shaft and the discharge port and the second closed region, to the other circumference of the outer rotor and the transverse sealing member is housed in each of the grooved portions.

Preferably, the inner and outer rotors are arranged to be in mesh with each other so that brake fluid in the teeth gap portion or teeth gap portions falling within the first closed region may be compressed. As a result, unusual frictional wear of the teeth of the inner and outer rotors may be prevented.

As another aspect of the present invention, the rotary pump has a sealing member by which the fluid leakage through the clearance between the casing and the outer circumference surface of the outer rotor may be effectively prevented.

To achieve the another aspect of the present invention in the rotary pump mentioned above, an inner wall of the bore of the center plate facing the outer circumference of the outer rotor is provided with two recessed portions and a lateral sealing member is housed in each of the recessed portions for preventing brake fluid communication from the discharge port side to the intake port side in the outer circumference of the outer rotor. The lateral sealing member has a portion whose length in an axial direction of the drive shaft is larger than the thickness of the center plate before the lateral sealing member is put and loaded by the transverse sealing member or directly by the first and second side plates.

Preferably, the two recessed portions are located on the intake port side with respect to a hypothetical line connecting a center of the first closed region and a center of the second closed region.

It is a further aspect of the present invention to provide detail structures of the transverse sealing members and the lateral sealing members that can effectively prevent the brake fluid leakage from the discharge port side to the intake port side through the respective clearances mentioned above.

To this end, the transverse sealing member is comprised of a first element made of elastic material and arranged on a bottom side of the grooved portion and a second element arranged on an opening side of the grooved portion. The second element is in closed contact with the inner and outer rotor by means of elastic force of the first element so that the sealing function of the transverse sealing member may be ensured.

Further, it is preferable that the grooved portion is shaped a ring that is off-centered with respect to an axis of the drive shaft, the first element is an o-ring and the second element is a resin ring. As a result, the transverse sealing member is in contact only with limited parts of the inner and outer rotors for sealing.

Furthermore, an area of a surface of the second element actually in contact with the inner rotor is smaller than that of the surface being pressed by the first element for diminish the contact resistance.

In particular, the surface in contact with the inner rotor is provided with a step portion that the surface of the second element is stepped. The second element hangs over the teeth gap portions on the discharge port side with a clearance between the step portion and the teeth gap portions in a direction perpendicular to the drive shaft so that the teeth gap portions on the discharge port side may communicate with the outer circumference of the outer rotor on the discharge port side.

On the other hand, the lateral sealing member is comprised of an elastic element arranged on a bottom side of the recessed portion and a resin element on an opening side of the recessed portion. A length of the resin element in an axial direction of the drive shaft is larger than the thickness of the center plate before the resin element is put between and loaded by the transverse sealing members.

Preferably, the resin element may have a tapered surface at a corner thereof on a bottom side of the recessed portion and on the discharge port side and the elastic element may be arranged between the tapered surface and the recessed portion.

It is a final object of the present invention to provide a brake apparatus having a hydraulic circuit in which the rotary pump described above is applied. The rotary pump is used for increasing fluid pressure to wheel cylinders in the hydraulic circuit.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

A first embodiment of the present invention is described with reference to FIGS. 1, 2A and 2B.

Figure 1:
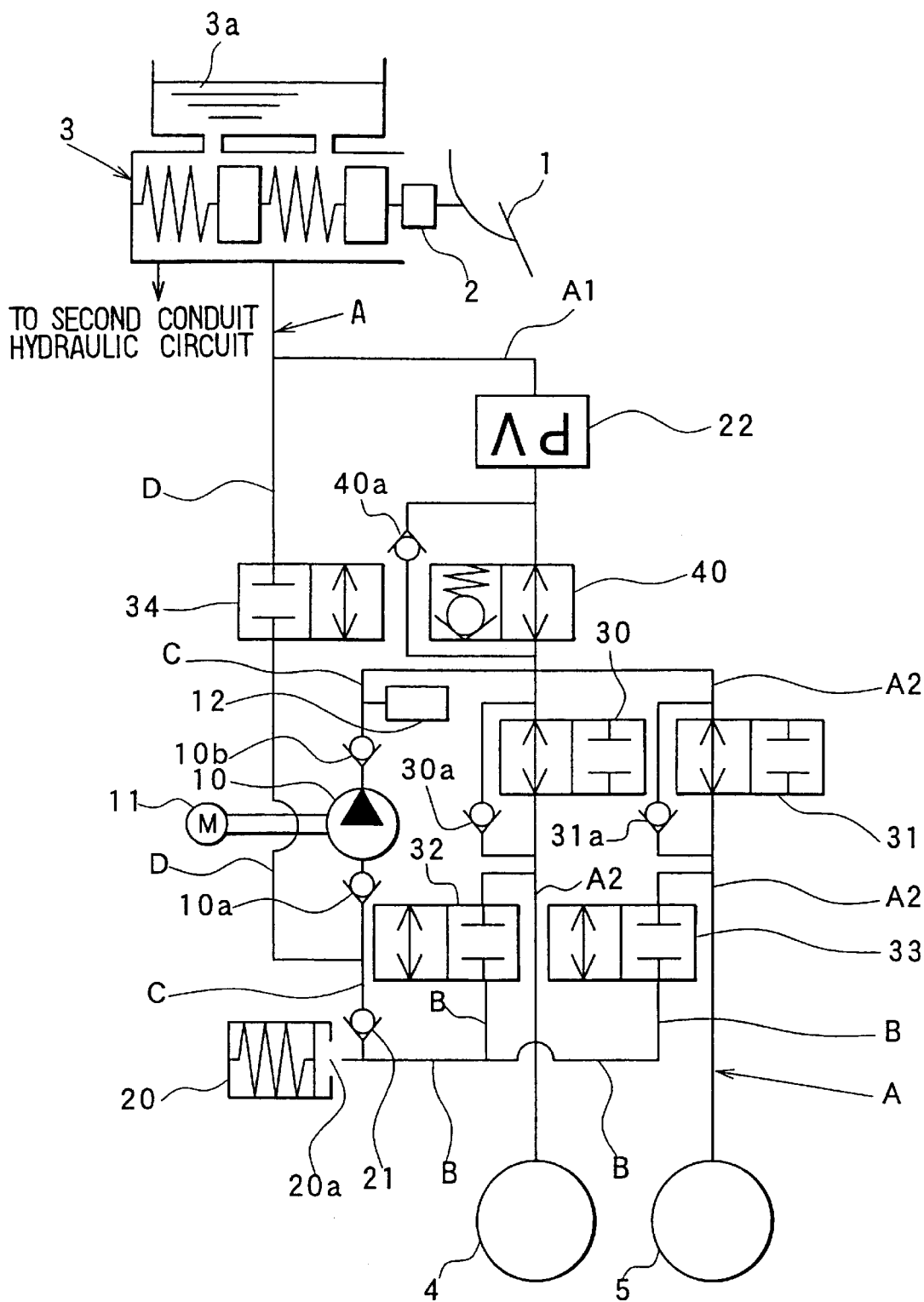
FIG. 1 is an outline structure of a brake apparatus according to a first embodiment.

FIG. 1 shows an outline structure of a brake apparatus to which a trochoid pump as a rotary pump is applied. The basic composition of the brake apparatus will be described with reference to FIG. 1. In this embodiment, a brake apparatus is applied to a vehicle provided with a hydraulic circuit of a diagonal conduit system having a first conduit connecting wheel cylinders of a front right wheel and a rear left wheel and a second conduit connecting wheel cylinders of a front left wheel and a rear right wheel. The vehicle is a four wheel vehicle of front wheel drive.

As shown in FIG. 1, a brake pedal 1 is connected to a booster 2. The booster 2 boosts brake depression force.

Further, the booster 2 is provided with a rod for transmitting boosted depression force to a master cylinder 3. In detail, the master cylinder 3 generates master cylinder pressure when the rod pushes a master piston arranged in the master cylinder 3. The brake pedal 1, the booster 2 and the master cylinder 3 correspond to a brake fluid pressure generating device.

The master cylinder 3 is provided with a master reservoir 3a for supplying brake fluid into the master cylinder 3 or storing extra brake fluid of the master cylinder 3.

Further, the master cylinder pressure is transmitted to a wheel cylinder 4 for a front right wheel (FR) and a wheel cylinder 5 for a rear left wheel (RL) via a brake assist system provided with a function of an antilock brake system (hereinafter, referred to as ABS). In the following explanation, the brake apparatus will be described with respect to the hydraulic circuit in the first conduit connecting the wheel cylinders of a front right wheel (FR) and a rear left wheel (RL). The explanation for the second conduit connecting the wheel cylinders of a front left wheel (FL) and a rear right wheel (RR) will be omitted since the hydraulic circuit in the second conduit is quite similar to that in the first conduit.

The brake apparatus is provided with a conduit (main conduit) A connected to the master cylinder 3. A proportioning valve (PV) 22 is disposed in the main conduit A. The main conduit A is divided into two portions by the proportioning valve 22. That is, the main conduit A is divided into a first conduit A1 from the master cylinder 3 to the proportioning valve 22 and a second conduit A2 from the proportioning valve 22 to the respective wheel cylinders 4 and 5.

The proportioning valve 22 has a function of transmitting a reference pressure of a brake fluid to the downstream side with a predetermined attenuation rate when the braking fluid flows in the positive direction (in this embodiment, a direction from the side of the wheel cylinder to the side of the master cylinder is the positive direction). That is, by inversely connecting the proportioning valve 22 as shown in FIG. 1, pressure of the brake fluid on the side of the second conduit A2 becomes the reference pressure.

Further, the second conduit A2 branches out two conduits. A pressure increasing control valve 30 for controlling an increase of brake fluid pressure of the wheel cylinder 4 is installed to one of the branched conduits and a pressure increasing control valve 31 for controlling an increase of brake fluid pressure of the wheel cylinder 5 is installed to the other thereof.

The pressure increasing control valve 30 and 31 is a two-position valve capable of controlling communicating and shut-off states by an electronic control unit (hereinafter, referred to as ECU). When the two-position valve is controlled to a communicating state, the master cylinder pressure or the brake fluid pressure produced by a pump 10 can be applied to the respective wheel cylinders 4 and 5.

In the normal braking operation where ABS is not controlled by the ECU as in the case where pressure reduction of the wheel cylinder pressure is not carried out, the pressure increasing control valves 30 and 31 are always controlled in the communicating state. Safety valves 30a and 31a are installed in parallel with the pressure increasing control valves 30 and 31, respectively. The safety valve 30a, 31a allows the brake fluid to swiftly return from the wheel cylinder 4, 5 to the master cylinder 3 when ABS control has been finished by stopping depression of the brake pedal 1.

A pressure reducing control valve 32, 33 capable of controlling communicating and shut-off states by the ECU is arranged at conduits B connecting the second conduit A2 between the pressure increasing control valve 30, 31 and the wheel cylinder 4, 5, and a reservoir port 20a of a reservoir 20. In the normal braking operation, the pressure reducing control valves 32 and 33 are always brought into a cut-off state.

A rotary pump 10 is arranged at a conduit C connecting the reservoir hole 20a of the reservoir 20 and the second conduit A2 between the proportioning valve 22 and the pressure increasing control valves 30 and 31. Safety valves 10a and 10b are disposed in the conduit C on both sides of the rotary pump 10. A motor 11 is connected to the rotary pump 10 to drive the rotary pump 10. A detailed explanation of the rotary pump 10 will be given later.

A damper 12 is arranged on the discharge side of the rotary pump 10 in the conduit C to alleviate pulsation of the brake fluid delivered by the rotary pump 10. An auxiliary conduit D is installed to connect the conduit C between the reservoir 20 and the rotary pump 10, and the master cylinder 3. The rotary pump 10 sucks the brake fluid of the first conduit A1 via the auxiliary conduit D and discharges it to the second conduit A2, whereby the brake fluid pressures of the wheel cylinders 4 and 5 are made higher than the master cylinder pressure. As a result, wheel braking forces of the wheel cylinders 4 and 5 are increased. The proportioning valve 22 works to hold the pressure difference between the master cylinder pressure and the wheel cylinder pressure.

A control valve 34 is installed in the auxiliary conduit D. The control valve 34 is always brought into a cut-off state in the normal braking operation.

A check valve 21 is arranged between a connection point of the conduit C and the auxiliary conduit D and the reservoir 20 to prevent the brake fluid drawn via the auxiliary conduit D from flowing in a reverse direction to the reservoir 20.

A control valve 40 is disposed between the proportioning valve 22 and the pressure increasing control valves 30 and 31 in the second conduit A2. The control valve 40 is normally controlled in a communicating state. However, the control valve 40 is switched to a differential pressure producing state to hold the pressure difference between the master cylinder pressure and the wheel cylinder pressure, when the vehicle is braked in panic or traction control (TRC) is carried out so that the brake fluid pressure of the wheel cylinders 4 and 5 may be controlled to become higher than the master cylinder pressure.

Figure 2A:
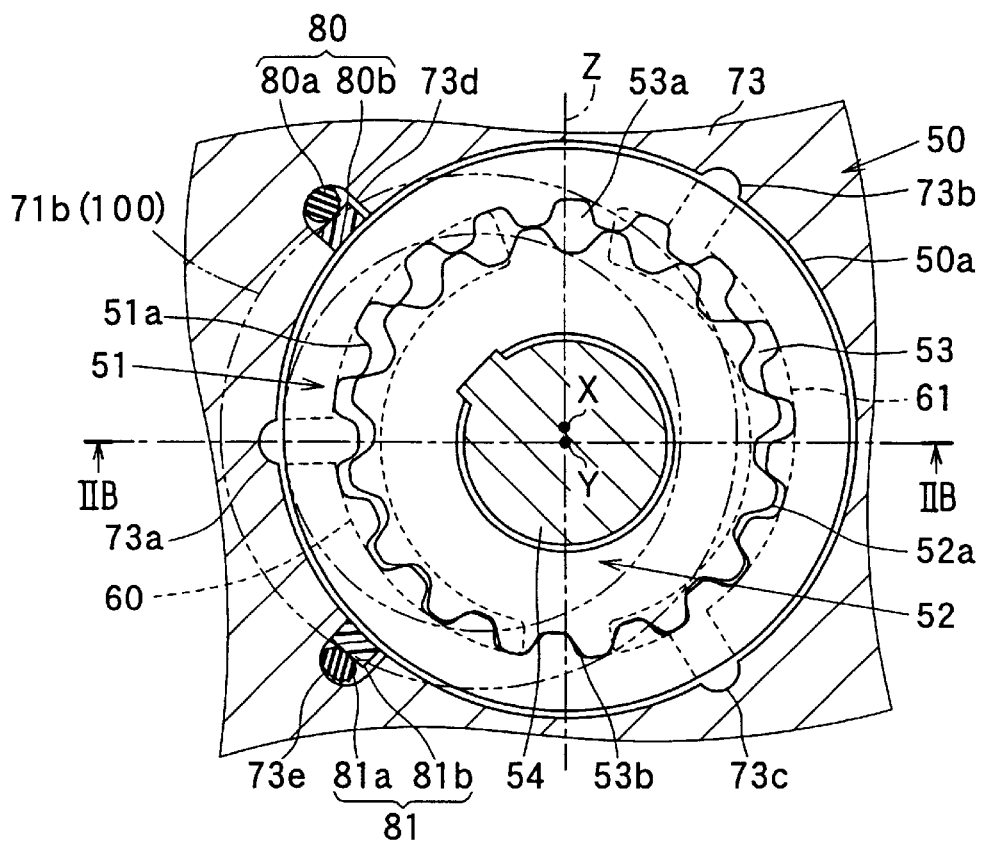
FIG. 2A is a sectional view of the rotary pump of FIG. 1.

FIG. 2A shows a sectional view of the rotary pump 10. FIG. 2B shows a sectional view taken along a line IIB—IIB of FIG. 2 A. First, the structure of the rotary pump 10 will be described with reference to FIGS. 2A and 2B.

An outer rotor 51 and an inner rotor 52 are contained in a rotor room 50a of the casing 50 of the rotary pump 10. The outer rotor 51 and the inner rotor 52 are assembled in the casing 50 in a state where respective centre axes (point X and point Y in the drawing) are shifted from each other. The outer rotor 51 is provided with an inner teeth portion 51a at its inner periphery. The inner rotor 52 is provided with an outer teeth portion 52a at its outer periphery. The inner teeth portion 51a of the outer rotor 51 and the outer teeth portion 52a of the inner rotor 52 are in mesh with each other and form a plurality of teeth gap portions 53. As is apparent from FIG. 2A, the rotary pump 10 is a multiple teeth trochoid type pump having no partition plates (crescent) in which the teeth gap portions 53 are formed by the inner teeth portion 51a of the outer rotor 51 and the outer teeth portion 52a of the inner rotor 52. The inner rotor 52 and the outer rotor 51 share a plurality of contact points (that is, contact faces) at the mesh faces in order to transmit rotation torque of the inner rotor 52 to the outer rotor 51.

Figure 2B:
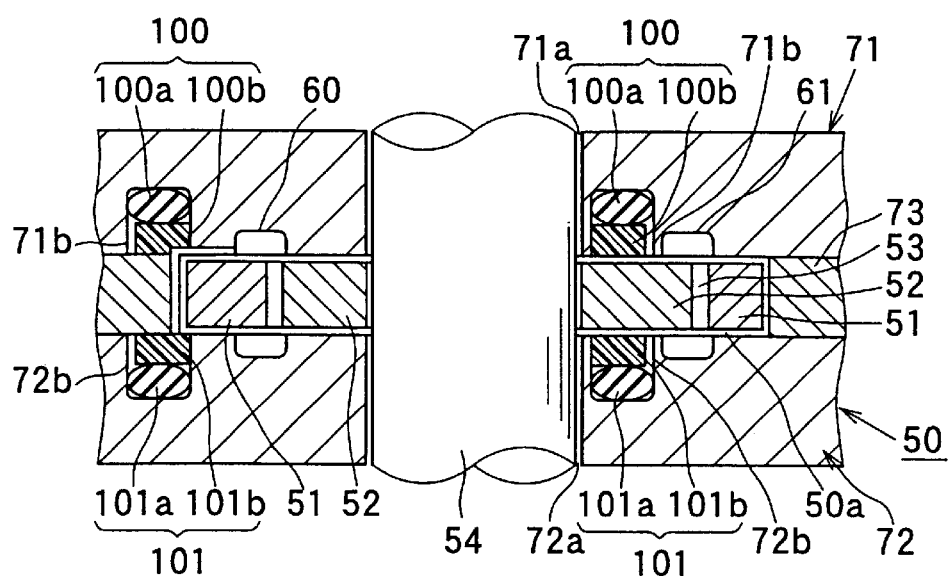
FIG. 2B is a sectional view taken along a line IIB—IIB of FIG. 2A.

As shown in FIG. 2B, the casing 50 is composed of a first side plate 71 and a second side plate 72 that are placed on opposite sides of the outer and inner rotors 51 and 52, and a center plate 73 placed between the first side plate 71 and a second side plate 72. The center plate 73 is provided with a bore in which the outer and inner rotors 51 and 52 are housed. The first and second side plates 71 and 72 and the center plate 73 constitute the rotor room 50a.

The first and second side plates 71 and 72 are respectively provided at their center portions with center bores 71a and 72a which communicate with the rotor room 50a. The drive shaft 54 fitted to the inner rotor 52 is housed in the center bores 71a and 72a. The outer rotor 51 and the inner rotor 52 are rotatably arranged in the bore of the center plate 73. That is, a rotating unit constituted by the outer rotor 51 and the inner rotor 52 is rotatably contained in the rotor room 50a of the casing 50. The outer rotor 51 rotates with a point X as a rotation axis and the inner rotor 52 rotates with a point Y as a rotation axis.

When a line running on both point X and point Y respectively corresponding to the rotation axes of the outer rotor 51 and the inner rotor 52 is defined as a center line Z of the rotary pump 10, the intake port 60 and the discharge port 61 both of which communicate with the rotor room 50a are formed on the left and right sides of the center line Z in the first and second side plates 71 and 72. The intake port 60 and the discharge port 61 are arranged respectively at positions communicating with a plurality of teeth gap portions 53. The brake fluid from outside can be sucked into the teeth gap portions 53 via the intake port 60 and the brake fluid in the teeth gap portions 53 can be discharged to outside via the discharge port 61.

There exist a maximum volume teeth gap portion where the brake fluid volume is the largest and a minimum volume teeth gap portion where the brake fluid volume is the smallest among the plurality of the teeth gap portions 53. The rotor room 50a is provided, between the intake and discharge ports 60 and 61, with first and second closed regions 53a and 53b respectively located on the sides of the maximum and minimum volume teeth gap portions and communicated neither with the intake port 60 nor with the discharge port 61. The first and second closed regions 53a and 53b serve to hold pressure difference between the intake pressure at the intake port 60 and the discharge pressure at the discharge port 61.

The first and second side plates 71 and 72 and the center plate 73 are provided respectively with a communicating path 73a for communicating the outer circumference of the outer rotor 51 with the intake port 60 and communicating paths 73b and 73c for communicating the outer circumference of the outer rotor 51 with the discharge port 61. The communicating path 73a is arranged at a position advanced in a direction from the center line Z to the intake port 60 by an angle of about 90 degrees centering on the point X constituting the rotation axis of the outer rotor 51. The communicating path 73b is formed to communicate the teeth gap portion 53 most adjacent to the first closed region 53a among the plurality of teeth gap portions 53 communicating with the discharge port 61 with the outer circumference of the outer rotor 51. The communicating path 73c is formed to communicate the teeth gap portion 53 most adjacent to the second closed region 53b among the plurality of teeth gap portions 53 communicating with the discharge port 61 with the outer periphery of the outer rotor 51. Specifically, the communicating paths 73b and 73c are arranged respectively at positions advanced in right and left directions from the center line Z to the discharge port 61 by an angle of about 22.5 degrees centering on the point X.

Recessed portions 73d and 73e are formed on an inner wall of the bore of the center plate 73 at positions advanced in the left and right directions, respectively, from the center line Z to the intake port 60 by an angle of about 45 degrees centering on the point X constituting the rotation axis of the outer rotor 51. Lateral sealing members 80 and 81 are respectively installed in the recessed portions 73a and 73b to restrain the brake fluid from flowing in the outer circumference of the outer rotor 51. In more detail, the lateral sealing members 80 and 81 are arranged respectively at intermediate points between the communicating paths 73a and 73b and between the communicating paths 73a and 73c. The lateral sealing member 80, 81 serves to separate, in the clearance between the outer rotor 51 and the bore of the center plate 73, a portion in which pressure of the brake fluid is low from a portion in which pressure of the brake fluid is high.

The lateral sealing member 80, 81 is constituted by a spherical or cylindrical rubber element 80a, 81a and a rectangular shaped resin element 80b, 81b. The resin element 80b, 81b is made of PTFE, PTFE containing carbon fiber or PTFE containing graphite. The resin element 80b, 81b is biased or pressed by the rubber element 80a, 81a to be brought into contact with the outer rotor 51. That is, as the dimensional deviation of the outer rotor 51 due to manufacturing errors or the like is inevitable, the rubber element 80a, 81a having elastic force can absorb the dimensional deviation.

A width of the resin element 80b, 81b is shorter than that of the recessed portion 73d, 73e so that there may exist a gap to a certain extent in a rotating direction of the outer rotor 51 when the resin element 80b, 81b is housed in the recessed portion 73d, 73e. That is, in case that the width of the resin element 80b, 81b is equal to that of the recessed portion 73d, 73e, the resin element 80b, 81b is unlikely to go out of the recessed portion 73d, 73e, once the resin element 80b, 81b is pushed into the recessed portion 73d, 73e by pressurized brake fluid flow upon driving the pump. However, in case that the resin element 80b, 81b is housed with a gap to some degree in the recessed portion 73d, 73e so that the brake fluid may enter into on a side of the rubber element 80a, 81a with respect to the resin member 80b, 81b, the resin member 80b, 81b goes easily out of the recessed portion 73d, 73e as the pressure of the brake fluid acts back and forth on the resign element 80b, 81b.

As shown in FIG. 2B, the first and second side plates 71 and 72 are provided respectively with grooved portions 71b and 72b. Each of the grooved portion 71b, 72b is shaped a ring surrounding the drive shaft 54, as shown in a two dots-dash line in FIG. 2A. In more detail, the center of the grooved portion 71b, 72b is positioned eccentrically on a side of the intake port 60(on a left side of the drawing) with respect to the axial center of the drive shaft 54. The grooved portion 71b, 72b passes through a portion between the discharge port 61 and the drive shaft 54, the first closed region 53a and the second closed region 53b and portions where the lateral sealing members 80 and 81 seal the outer circumference of the outer rotor 51.

Transverse sealing members 100 and 101 are housed respectively in the grooved portions 71b and 72b. The transverse sealing member 100, 101 is composed of an o-ring 100a, 101a and a ring shaped resin element 100b, 101b. The resin element 100b, 101b is arranged to be in contact with the inner rotor 52, the outer rotor 51 and the center plate 73 and, for performing the sealing function, biased by the o-ring 100a, 101a placed on a bottom side of the grooved portion 71b, 72b with respect to the resin element 100b, 101b. The resin element 100b, 101b is made of PEEK or PEEK containing carbon which is harder than material of the resin element 80b, 81b.

As mentioned above, the transverse sealing members 100 and 101 serve to seal the brake fluid communication between the high pressure discharge port 61 and the low pressure clearance between the drive shaft 54 and the inner rotor 52 or the low pressure intake port 60 through respective clearances between the axial end surfaces of the inner and outer rotors 52 and 51 and the first and second side plates 71 and 72.

To seal effectively the clearances between the axial end surfaces of the inner and outer rotors 52 and 51 and the first and second side plates 71 and 72, it is essential that each of the transverse sealing members 100 and 101 extends from the lateral sealing member 80 at the outer circumference of the outer rotor 51, via the first closed region 53a, a portion between the discharge port 61 and the drive shaft 54, the second closed region 53b, to the lateral sealing member 81 at the outer circumference of the outer rotor 51. As the transverse sealing member 100, 101 seals only portions necessary for restraining the brake fluid leakage between high and low pressure portions and, therefore, is in minimum contact with the outer and inner rotors 51 and 52, the contact resistance of the transverse sealing member 100, 101 is smaller so that the mechanical loss may be limited.

Next, an explanation will be given of operations of the brake apparatus and the rotary pump 10. The control valve 34 provided in the brake apparatus is pertinently brought into a communicating state when high pressure brake fluid needs to be supplied to the wheel cylinders 4 and 5, for example, when braking force in correspondence with depressing force of the brake pedal 1 cannot be obtained or when an operating amount of the braking pedal 1 is large. When the control valve 34 is switched to the communicating state, the master cylinder pressure generated by depressing the brake pedal 1 is applied to the rotary pump 10 via the auxiliary conduit D.

In the rotary pump 10, the inner rotor 52 is rotated in accordance with rotation of the drive shaft 54 by driving the motor 11. In response to rotation of the inner rotor 52, the outer rotor 51 is also rotated in the same direction as the inner teeth portion 51a is in mesh with the outer teeth portion 52a. At this time, each volume of the teeth gap portions 53 is changed from large to small or vice versa during a cycle in which the outer rotor 51 and the inner rotor 52 make one turn. Therefore, the brake fluid is sucked from the intake port 60 and is discharged from the discharge port 61 to the second conduit A2. Pressures of the wheel cylinders can be increased using the discharged brake fluid.

In this way, the rotary pump 10 can carry out a basic pumping operation in which the brake fluid is sucked from the intake port 60 and is discharged from the discharge port 61 by rotation of the outer and inner rotors 51 and 52. During the pumping operation, the outer circumference of the outer rotor 51 on a side of the intake port 60 is at intake pressure by brake fluid to be sucked through the communicating path 73a and the outer circumference of the outer rotor 51 on a side of the discharge port 61 is at discharge pressure by brake fluid to be discharged through the communicating paths 73b and 73c. Therefore, at the outer circumference of the outer rotor 51, the pressure difference exists between the low pressure portion communicating to the intake port 60 and the high pressure portion communicating to the discharge port 61. Further, at the clearance between the axial end surfaces of the outer and inner rotors 51 and 52 and the first and second side plates 71 and 72, there exist both high and low pressure portions caused by the intake port 60 at low pressure, the clearance at low pressure between the drive shaft 54 and the inner rotor 52, and the discharge port 61 at high pressure.

However, the brake fluid leakage from the high pressure portion on the side of the discharge port 61 to the low pressure portion on the side of the intake port 60 at the outer circumference of the outer rotor 51 is prevented by the lateral sealing members 80 and 81 formed respectively between the communicating path 73a and 73b and between the communicating paths 73a and 73c. Further, the transverse sealing members 100 and 101 may seal the brake fluid leakage from the high pressure portion to the low pressure portion at the clearance between the axial end surfaces of the inner and outer rotors 52 and 51 and the first and second side plates 71 and 72. Furthermore, as the transverse sealing member 100, 101 passes through the lateral sealing member 80, 81, there is no gap between the transverse sealing member 100, 101 and the lateral sealing members 80, 81 so that the brake fluid leakage from this gap may be restrained.

The lateral sealing members 80 and 81 are so operative that the outer circumference of the outer rotor 51 on the side of the intake port 60 may be exposed to low pressure which is same to the pressure of the teeth gap portions 53 communicating with the intake port 60 and the outer circumference of the outer rotor 51 on the side of the discharge port 61 may be exposed to high pressure which is same to the pressure of the teeth gap portions 53 communicating with the discharge port 61. As a result, pressures at the outer and inner circumferences of the outer rotor 51 are balanced so that the pump operation may become stable.

As mentioned above, both of the lateral sealing members 80 and 81 are positioned on the side of the intake port 60 with respect to the center line Z, the first and second closed regions 53a and 53b are surrounded by the discharge high pressure at the outer circumference of the outer rotor 51.

Therefore, as the outer rotor 51 is pressed from both upper and lower sides in the drawing and, further, the inner rotor 52 is pushed toward the outer rotor 51 on the side of the first closed region 53a so that the teeth top clearance between the inner teeth portion 51a of the outer rotor 51 and the outer teeth portion 52a of the inner rotor 52 may be diminished, thus preventing the brake fluid leakage from the teeth top clearance between the inner teeth portion 51a of the outer rotor 51 and the outer teeth portion 52a of the inner rotor 52 at the firs t closed region 53a.

Figure 3:
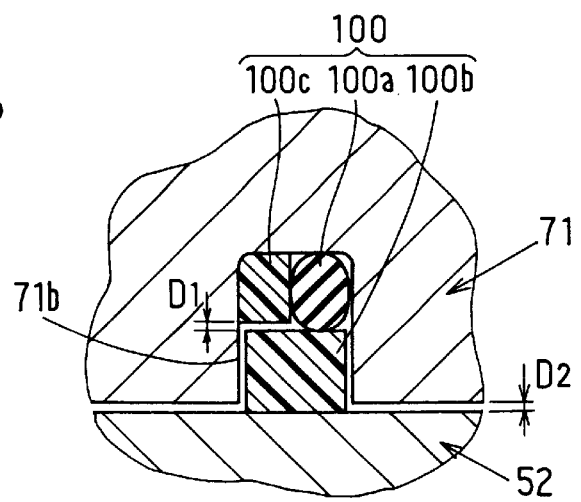
FIG. 3 is an enlarged cross sectional view of a transverse sealing ember according to a second.

A second embodiment of the present invention is described with reference to FIG. 3. FIG. 3 shows an enlarged cross sectional view of a transverse sealing member 100 according to the second embodiment as a modification of that of the first embodiment. With respect to the structure of the transverse sealing member 101 similar to that of the transverse sealing member 100, the explanation is omitted.

The transverse sealing member 100 of the second embodiment is composed of an elastic element such as an o-ring 100a smaller than that of the first embodiment (refer to FIG. 2B), the resin element 100b and a resin element 100c disposed at a side of the o-ring 100a.

The area of the resin element 100b against which the o-ring 100a is pressed is restricted. Therefore, the region where the resin element 100b pushes the inner and outer rotors 52 and 51 is narrowed so that the contact resistance of the transverse sealing member 100 and, thus, the mechanical loss thereof may be limited.

The clearance D1 between the resin elements 100b and 100c is smaller than the clearance D2 between the first side plate 71 and the outer or inner rotor 51 or 52. When the outer or inner rotor 51 or 52 is pressed to shift in an axial direction, the elastic element 100a can not prevent the shift because the elastic element 100a itself compresses so that the outer or inner rotor 51 or 52 may be in direct contact with the first side plate 71, thus causing a bigger contact resistance.

However, according to the second embodiment, the resin element 100b can not move beyond the length of the clearance D1 so that the outer or inner rotor 51 or 52 may be never in contact with the first side plate 71. As a result, the contact resistance, that is, the mechanical loss can be limited.

According to the embodiment mentioned above, though the resin element 100c is separately provided, the resin element 100c may be integrally provided with the resin element 100b or with the first side plate 71.

Figure 4:
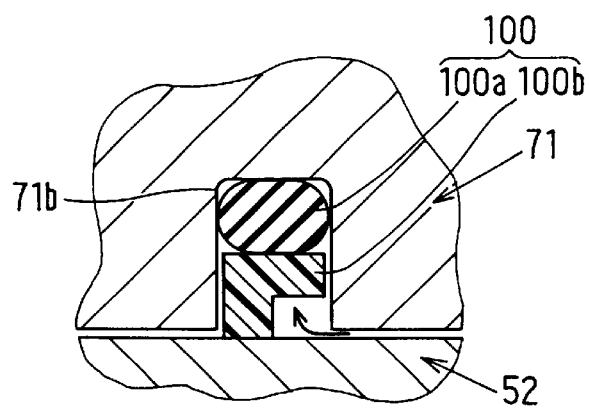
FIG. 4 is an enlarged cross sectional view of a transverse sealing member according to the third embodiment.

A third embodiment of the present invention is described with reference to FIG. 4. FIG. 4 shows an enlarged cross sectional view of a transverse sealing member 100 according to the third embodiment as a modification of that of the first embodiment. With respect to the structure of the transverse sealing member 101 similar to that of the transverse sealing member 100, the explanation is omitted.

A different point from the first embodiment is that the sealing element 100b according to the third embodiment has a step portion at an outer circumference thereof on a side of the inner and outer rotors 52 and 51.

The resin element 100b on the side of the high pressure discharge port is pressed upward in the drawing by high pressure brake fluid acting on the step portion, as shown by an arrow in FIG. 4. The pressing force acting upward at the step portion counterbalances the biasing force acting downward due to the o-ring 100a. Therefore, at the region where the step portion is provided, the resin element 100b do not press the inner and outer rotors 52 and 51 so that the contact resistance of the transverse sealing members 100 and 101 and, thus, the mechanical loss thereof may be limited.

Figure 5A:
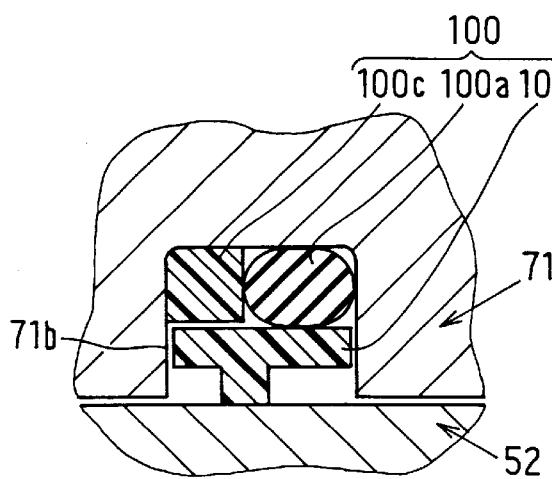
FIG. 5A is an enlarged cross sectional view of a transverse sealing member according to a fourth embodiment.
Figure 5B:
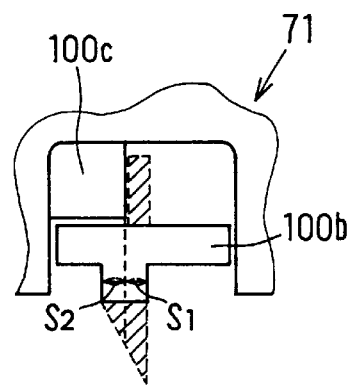
FIG. 5B is a schematic view for explaining the feature of a resin element according to a fourth embodiment.

A fourth embodiment of the present invention is described with reference to FIGS. 5A and 5B. FIG. 5A shows an enlarged cross sectional view of a transverse sealing member 100 according to the fourth embodiment as a modification of that of the second embodiment. The transverse sealing member 100 is provided with a step portion having the shape as explained below in detail. FIG. 5B shows a schematic view for explaining the feature of the resin element 100b. With respect to the structure of the transverse sealing member 101 similar to that of the transverse sealing member 100, the explanation is omitted.

As shown in FIG. 5B, the step portion of the resin element 100b is shaped in a manner that, on a surface of the resin element 100b in contact with the outer and inner rotors 51 and 52, a length S1 of the region where the O-ring 100a presses is equal to a length S2 of the region where the o-ring 100a does not press.

The function of the transverse sealing member 100 as mentioned above is described with reference to FIG. 5B. The o-ring 100a presses the resin element 100b downward in the drawing. As the pressing force of the o-ring 100a at the region where the step portion is provided counterbalances the brake fluid high pressure as mentioned before, the pressing force of the o-ring 100a not to be counterbalanced in this way is distributed as shown at an upper side in the drawing as a rectangular shaped slanting line portion.

On the other hand, the pressing force acting on the surface of the resin element 100b in contact with the outer and inner rotors 52 and 51 is distributed as shown at a lower side in the drawing as a triangular shaped slanting portion. As one side (right side in the drawing) of the contacting surface of the resin element 100b corresponds to the side of the high pressure discharge port 61 and the other side (left side in the drawing) thereof to the side of the low pressure intake port 60, the pressing force acting on the contacting surface of the resin element 100b is the largest on the most right side and becomes smaller gradually towards the left side. The resin element 100b is pressed upward in the drawing by the brake fluid pressure having the pressing force distribution mentioned above.

As the length S1 is equal to the length S2 as mentioned above, the area of the rectangular shaped slanting line portion coincides with the triangular shaped slanting line portion. Therefore, all of the pressing force acting downward by the O-ring 100a counterbalance the pressing force acting upward by the brake fluid pressure so that the contact resistance and, thus, the mechanical loss of the transverse sealing member 100 may be extremely limited.

Though the length S1 is equal to the length S2 in the fourth embodiment, the contacting force of the transverse sealing member 100 may be adjusted by changing the ratio of the length S1 to the length S2.

Figure 6A:
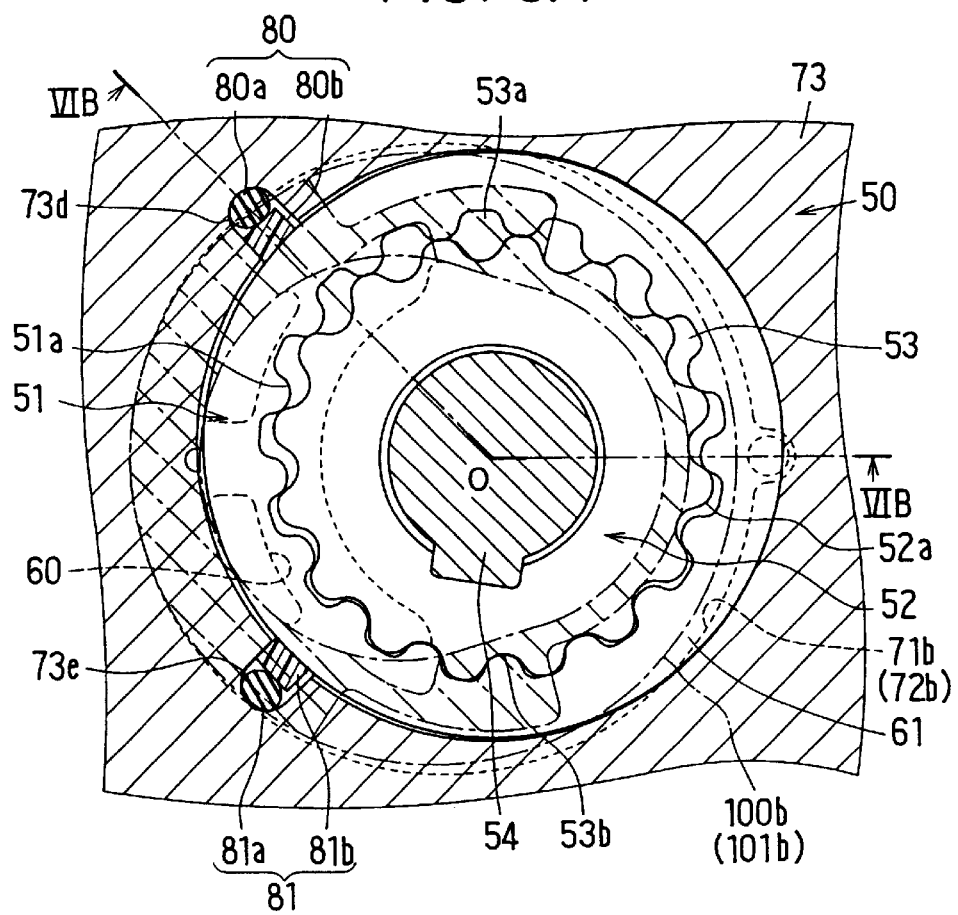
FIG. 6A is a sectional view of a rotary pump according to a fifth embodiment.
Figure 6B:
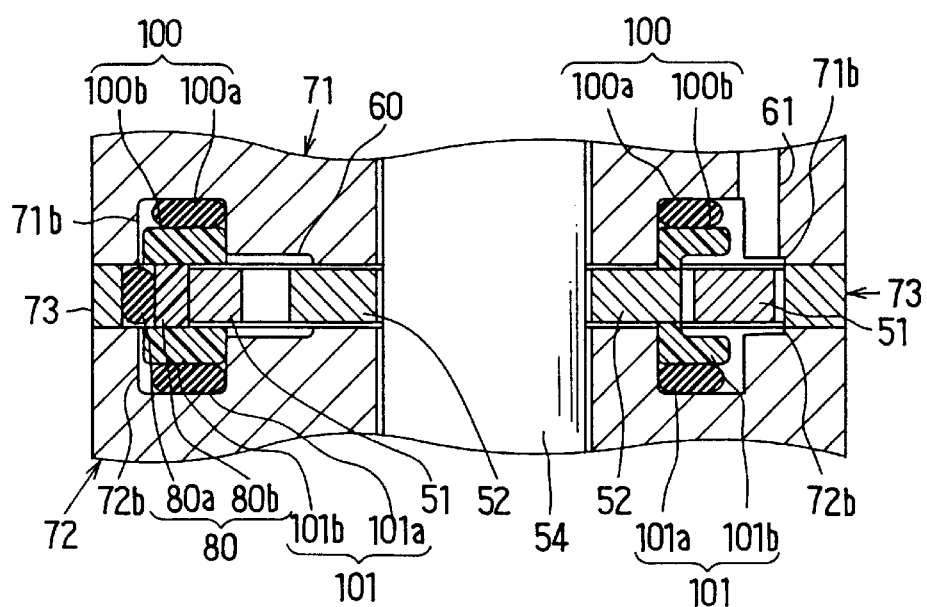
FIG. 6B is a sectional view taken along a line VIB—VIB of FIG. 6A.

A fifth embodiment of the present invention is described with reference to FIGS. 6A and 6B. FIG. 6A shows a sectional view of a rotary pump 10 according to the fifth embodiment. FIG. 6B shows a sectional view taken along a line VIB—VIB of FIG. 6A. In FIG. 6A, the transverse sealing members 100 and 101 are shown as a dot-dash line and the grooved portions 71b and 72b as a dot line.

Though each of the resin elements 100b and 100b of the transverse sealing members 100 and 101 according to the first embodiment is shaped substantially as a ring with nearly uniform width length, each shape of the resin elements 100b and 101b according to the fifth embodiment is not the ring with uniform width length but a ring with partly variable width length and partly provided with a step portion having advantages as described in the third and fourth embodiments.

The width of the resin element 100b, 100b is partly wider and the resin element 100b, 100b is partly provided with a step portion which hangs over all of the teeth gap portions 53 communicating with the discharge port 61, as shown by a dot-dash line in FIG. 6A.

As illustrated in FIG. 6B, the resin element 100b, 100b has the step portion on outer circumference surface thereof facing the outer and inner rotors 51 and 52 only on a side of the discharge port 61 so that only limited portions of the resin element 100b, 101b necessary for sealing may be in contact with the outer and inner rotors 51 and 52. Portions where the resin element 100b, 101b is in contact with the outer and inner rotors 51 and 52 and the center plate 73 are shown by dot-dash slanting lines in FIG. 6A.

According to the fifth embodiment, the ring shape of the resin element 100b, 101b corresponds at the inside thereof to, but do not correspond at the outside thereof to a ring shape of the grooved portion 71b, 72b. Therefore, a gap is constituted between the outer wall of the grooved portion 71b, 72b and the outer circumference of the resin element 100b, 101b by housing the resin element 100b, 100b into the grooved portion 71b, 72b. Further, there exists a gap between the teeth gap portions 53 and the step portion of the resin element 100b, 101b hanging over the teeth portions communicating with the discharge port 61. These gaps constitute the discharge port 61.

The ring shaped resin element 100b, 101b is in contact with the inner rotor 52 between the drive shaft 54 and the teeth gap portions 53 on the side of the discharge port 61, then, in contact with the inner and outer rotors 52 and 51 at the first and second closed regions 53a and 53b, then in contact with the lateral sealing members 80 and 81 and, finally, in contact with the center plate 73 outside the outer circumference of the outer rotor 51 on a side of the intake port 60.

As both of the drive shaft 54 and teeth gap portions 53 on the side of the intake port 60 are inside the inner circumference of the ring shaped resin element 100b, 101b, the brake fluid leakage from the high pressure side of the discharge port 61 to the low pressure side of the clearance between the drive shaft 54 and the inner rotor 52 and to the low pressure side of the intake port 60 may be prevented.

Further, the lateral sealing members 80 and 81 serve to separate the high pressure side of the discharge port 61 and the low pressure side of the intake port 60 at the outer circumference of the outer rotor 51.

Each outer wall of the grooved portions 71b and 72b crosses at two points the outer circumference of the outer rotor 51 on the side of the discharge port 61 and each inner wall thereof crosses at two points the outer circumference of the outer rotor 51 on a side of the intake port 60. Further, the respective grooved portions 71b and 72b have recess portions on a side of the discharge port 61, which communicate to the outer circumference of the outer rotor 51. Therefore, the high pressure discharge port 61 communicates with the teeth gap portions 53 and the outer circumference of the outer rotor 51 on the side of the discharge port 61. On the other hand, the low pressure intake port 60 communicates with the teeth gap portions 53 and the outer circumference of the outer rotor 51 on the side of the intake port 60.

As mentioned above, the resin element 100b, 101b is in minimum contact with the outer and inner rotors 51 and 52 to the extent that only necessary portions are sealed.

Further, the inner and outer rotors 52 and 51 are so assembled that brake fluid in the teeth gap portion within the first closed region 53a can be compressed and the teeth gap portion within the first closed region is sealed by the resign element 100b, 101b. On the other hand, the outer rotor 51 is pressed from both upper and lower sides in the drawing and, further, the inner rotor 52 is pushed toward the outer rotor 51 on the side of the first closed region 53a so that the teeth top clearance between the inner teeth portion 51a of the outer rotor 51 and the outer teeth portion 52a of the inner rotor 52 may be diminished. This pressing or pushing load, if it is too strong, is likely to cause an unusual frictional wear of the inner and outer teeth portions 51a and 52a.

However, the brake fluid in the teeth gap portion within the first closed region is compressed so that a pressure in a direction of expanding the teeth top clearance between the inner and outer teeth portions 51a and 52a is operative. Therefore, the load mentioned above is partly cancelled by the pressure so that the unusual frictional wear may be prevented.

Figure 7A:
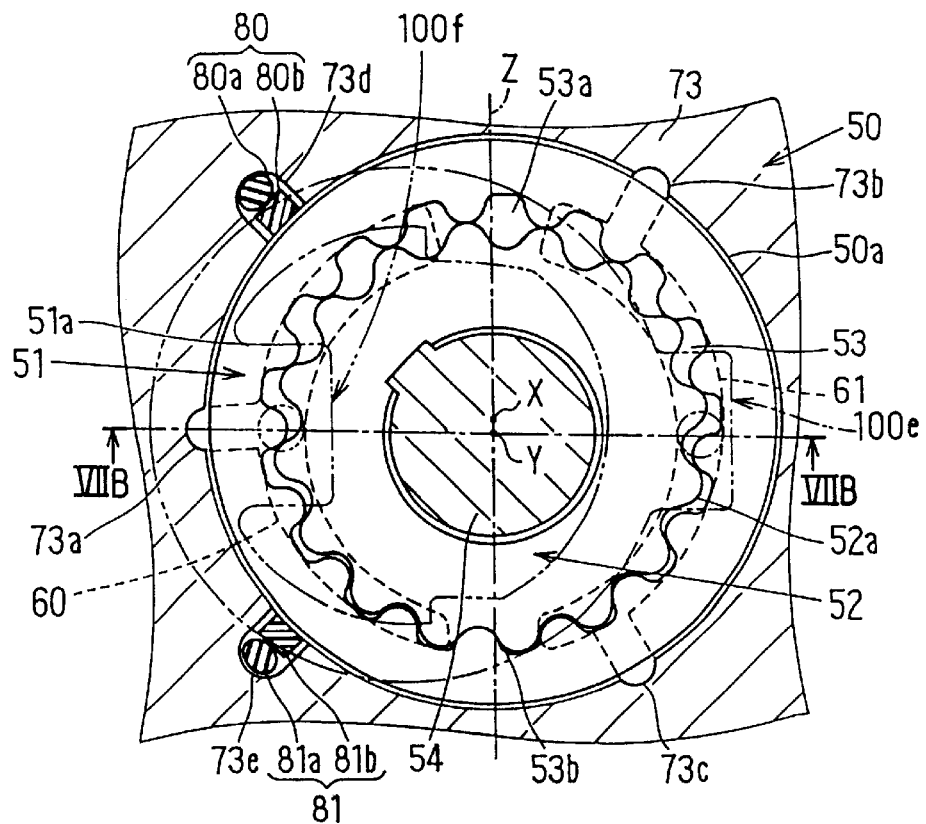
FIG. 7A is a sectional view of a rotary pump according to a sixth embodiment.
Figure 7B:
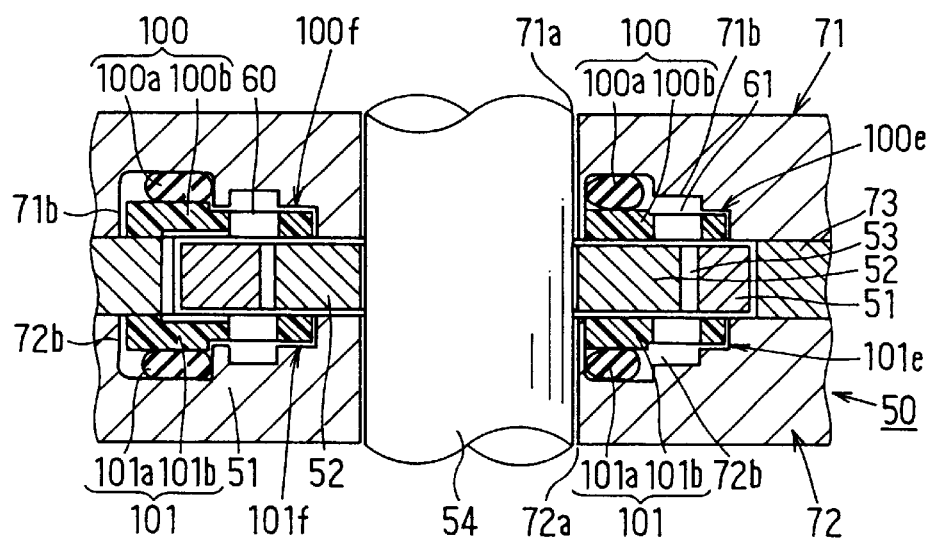
FIG. 7B is a sectional view taken along a line VIIB—VIIB of FIG. 7A.
Figure 8:
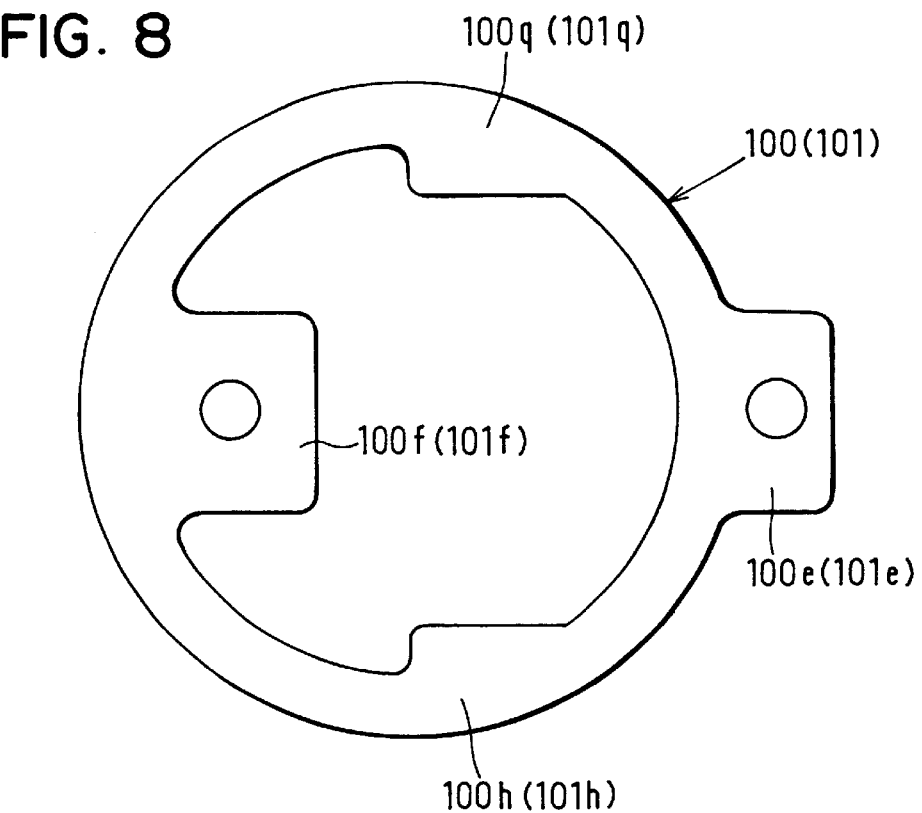
FIG. 8 is a plan view of a resin element according to the sixth embodiment.

A sixth embodiment of the present invention is described with reference to FIGS. 7A, 7B and 8. FIG. 7A shows a sectional view of a rotary pump 10 according to the sixth embodiment. FIG. 6B shows a sectional view taken along a line VIIB—VIIB of FIG. 7A. FIG. 8 shows a plan view of the resin element 100b, 101b. As shown in FIG. 7B, the first and second side plates 71 and 72 are provided with the grooved portions 71b and 72b, respectively. The grooved portion 71b, 72b is shaped as a ring surrounding the outside of the drive shaft 54 and having partly wider width portions as shown by a two dots-dash line in FIG. 7A. The center of the grooved portion 71b, 72b is eccentric to the center axis of the drive shaft 54 toward the intake port 60 (left side in the drawing). The grooved portion 71b, 72b passes through a portion between the discharge port 61 and the drive shaft 54, the first and second closed regions 53a and 53b and portions where the lateral sealing members 80 and 81 respectively seal the outer circumference of the outer rotor 51.

At respective positions of the intake and discharge ports 60 and 61 that cross a hypothetical line connecting the center axis of the drive shaft 54 and the center line of the grooved portion 71b, 72b, the width of the ring shaped grooved portion 71b, 72b is wider so as to overlap both of the inner and outer rotors 52 and 51. Further, at positions of the first and second closed regions 53a and 53b, the width of the ring shaped grooved portion 71b, 72b is also wider.

Transverse sealing members 100 and 101, in particular resin elements 100b and 101b, having the same shapes as those of the grooved portions 71b and 72b, as schematically shown in FIG. 8, are respectively housed in the grooved portions 71b and 72b. The transverse sealing member 100, 101 is composed of the resin element 100b, 101b and the elastic element 100a, 101a, which is similar to the first or second embodiment except that the respective resign elements 100b and 101b according to the sixth embodiment are provided with wide spread portions 100e, 101e, 100f, 101f, 100g, 101g and 100h, 1001h, respectively.

The wide spread portion 100e, 101e is provided at the discharge port 61 to overlap a part of the inner and outer rotors 52 and 53 and the wide spread portion 100f, 101f is provided at the intake port 60 to overlap a part of the inner and outer rotors 52 and 53. These wide spread portions 100e, 101e and 100f, 101f are provided for restraining the axially shifting movements of the inner and outer rotors 52 and 51 rather than for sealing the regions where these wide spread portions 100e, 101e and 100f, 101f are placed. Inherently, it is not necessary to seal these regions where the discharge and intake ports 61 and 60 are formed.

On the other hand, the wide spread portions 100g, 101g and 100h, 101h are provided to completely block the teeth gap portion within the first and second closed regions 53a and 53b so as to seal the brake fluid leakage from the teeth gap portions within the first and second closed regions 53a and 53b, respectively. Though these wide spread portions 100g, 101g and 100h, 101h may also serve to restrain mutual axial shifting movement of the inner and outer rotors 52 and 51, this is supplemental for the purpose of providing the wide spread portions 100g, 101g and 100h, 101h since the axially shifting movement of the inner and outer rotors 52 and 51 can be substantially prevented by the wide spread portions 100e, 101e and 100f, 101f.

As the wide spread portions 100g, 101g and 100h, 101h can focus on sealing the teeth gap portions within the first and second closed regions 53a and 53b, the frictional wear of the wide spread portions 100g, 101g and 100h, 101h is limited so that the deterioration of the sealing function thereof may be slower, compared with the first or second embodiment.

The wide spread portions 100e, 101e and 100f, 101f are provided with openings in order not to completely block any one of the teeth gap portions 53 because it is preferable to always communicate any of the teeth gap portions 53 variable for sucking or discharging brake fluid with the intake or discharge portion 60 or 61.

Though the width of the wide spread portion 100e, 101e does not reach the outer circumference of the outer rotor 51 according to the embodiment mentioned above, it is possible to employ the wide spread portion 100e, 101e having the wider width which reaches the center plate 73. In this case, the transverse sealing member 100, 101 is bridged over the center plate 73 so that the bending of the transverse sealing member 100, 101 may be limited.

Figure 9:
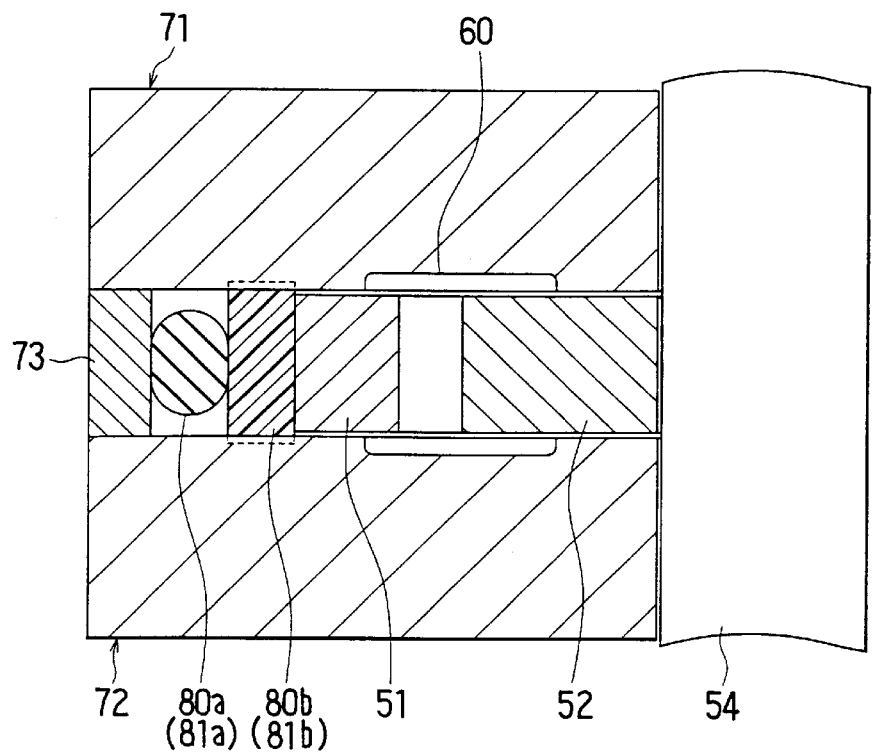
FIG. 9 is a cross sectional view of a part of a rotary pump according to a seventh embodiment.

The seventh embodiment of the present invention is described with reference to FIG. 9 showing a cross sectional view of a part of a rotary pump. FIG. 9 shows only a left half of the drawing, compared to the drawing as shown in FIG. 6B. Though the transverse sealing members 100 and 101 are in contact with the lateral sealing members 80 and 81, respectively, according to the embodiments mentioned before, the lateral sealing members 80 and 81 according to the seventh embodiment are not in contact with the transverse sealing members 100 and 101 but placed directly between the first and second side plates 71 and 72.

The brake fluid leakage from the high pressure side to the low pressure side through a clearance between the center plate 73 and the outer circumference of the outer rotor 51 is prevented by the lateral sealing members 80 and 81 arranged within the recessed portions provided at the inner circumference surfaces of the center plate 73, which are similar to the embodiments mentioned before. It is important, in this case, that the thickness (length in an axial direction of the drive shaft 54) of the respective lateral sealing members 80 and 81 coincides with a distance between the first and second side plates 71 and 72.

However, due to the manufacturing dimensional deviations or errors, clearances through which brake fluid leaks may be formed between each of the lateral sealing members 80 and 81 and each of the first and second side plates 71 and 72.

According to the seventh embodiment, the thickness of the resin element 80b, 81b is larger than the distance between the first and second side plates 71 and 72 (thickness of the center plate 73) before the pump is assembled, as shown by a dot line in FIG. 9. Then, after assembly, the resin element 80, 81 is compressed and deformed by and between the first and second side plates 71 and 72. Therefore, there exists no clearances between the resin element 80, 81 and the first or second side plate 71 or 72 so that that the fluid leakage may be prevented.

Figure 10:
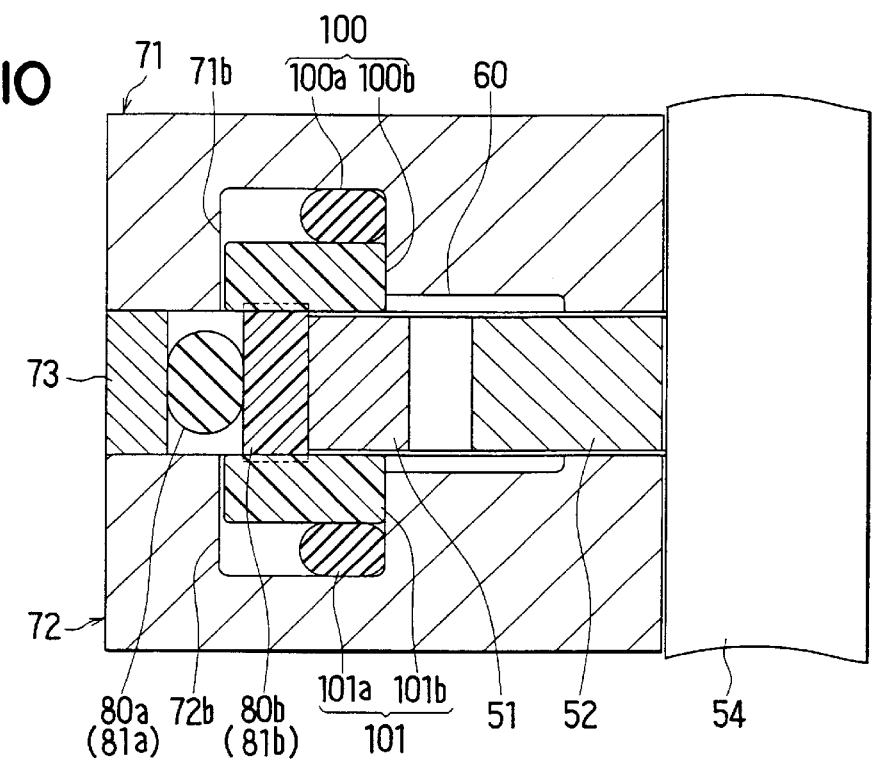
FIG. 10 is a cross sectional view of a part of a rotary pump according to an eighth embodiment.

An eighth embodiment of the present invention is described with reference to FIG. 10. FIG. 10 shows a cross sectional view of a part of a rotary pump according to the eighth embodiment. The lateral sealing member 80, 81 is put between the transverse sealing members 100 and 101, as shown in the first to fourth embodiments. Before the pump is assembled, a thickness of the resin element 80b, 81b is larger than a thickness of the center plate 73 so as to be always in contact with the resin elements 100b and 101b. Further, a sum of thickness of the resin element 100b, 101b and the elastic element 100a, 101a to be piled on the resin element 100b, 101b is larger than the depth of the grooved portion 71b, 72b. The resin element 80b, 81b after assembly is loaded by the resin elements 100b and 101b in a manner that the resin element 80b, 81b is put between the resin elements 100b and 101b. Therefore, the resin element 80b, 81b having the length as shown by a dot-line in FIG. 10 is compressed and deformed so that the resin element 80b, 81b may be firmly in contact with the resin elements 100b and 101b.

According to the eighth embodiment, the brake fluid leakage not only from the portion where the resin element 80b, 81b is in contact with the resin elements 100b and 101b but also from the clearances between the resin elements 100b and 101b and the outer and inner rotors 51 and 52 may be effectively diminished.

Figure 11A:
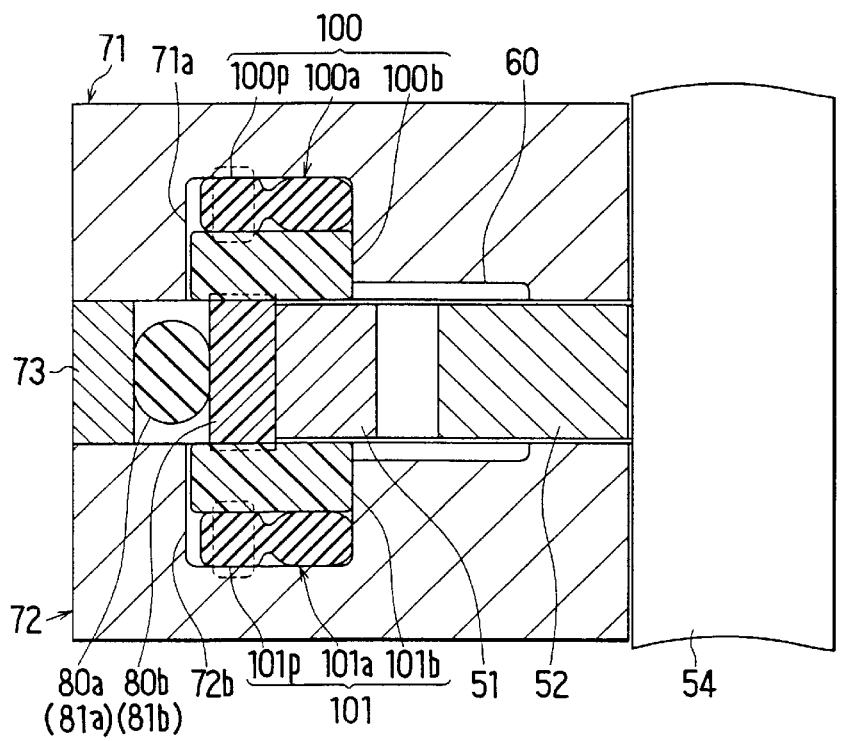
FIG. 11A is a cross sectional view of a part of a rotary pump according to a ninth embodiment.
Figure 11B:
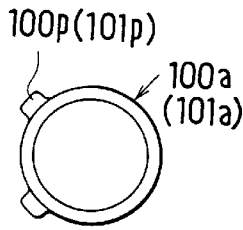
FIG. 11B is a plan view of an elastic element according to the ninth embodiment.

A ninth embodiment of the present invention is described with reference to FIGS. 11A and 11B. FIG. 11A shows a cross sectional view of a part of a rotary pump according to the ninth embodiment. FIG. 11B shows a plan view of the elastic element 100a, 101a.

The elastic element 100a, 101a is an o-ring having projections 100p and 101p only at the places where the lateral sealing members 80 and 81 are arranged. The thickness of the projection 100p, 101p in an axial direction of the drive shaft 54 is larger than that of the other portions of the o-ring before the resin element 80b, 81b is assembled to the pump, as shown in FIGS. 11A and 11B. In more detail, the projection 100p, 101p has a cross section as shown by a dot line in the drawing before the projection 100p, 101p is loaded. On assembling the pump, the projection 100p, 101p serves to press and deform more firmly the resin element 80b, 81b having such a shape as shown by a dot line in the drawing before assembly. The ninth embodiment has similar function and effect as disclosed in the eighth embodiment.

Figure 12:
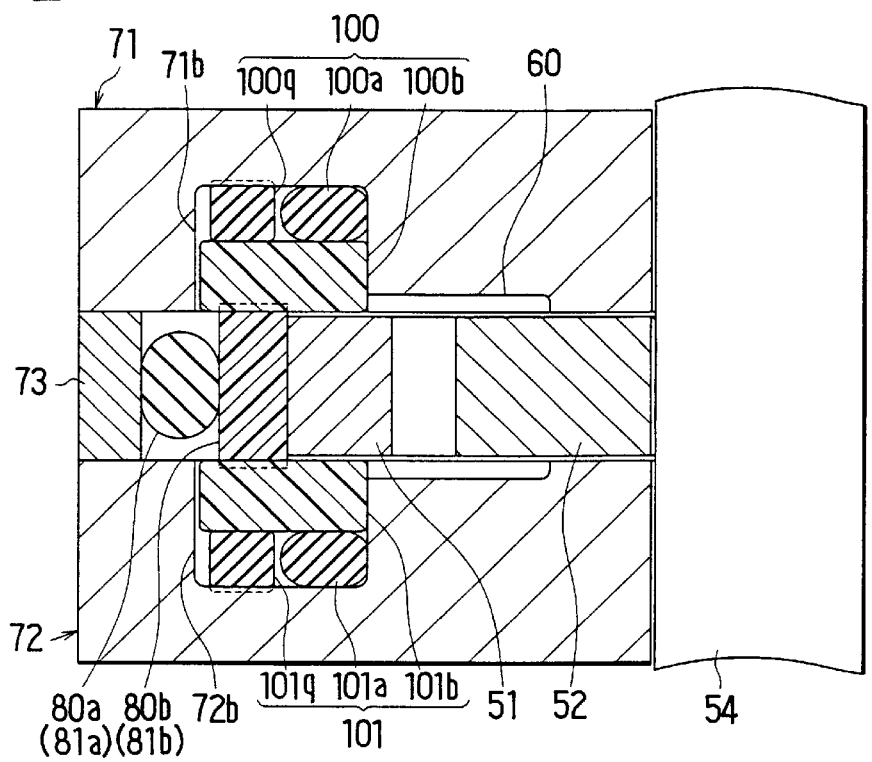
FIG. 12 is a cross sectional view of a part of a rotary pump according to a tenth embodiment.

A tenth embodiment of the present invention is described with reference to FIG. 12. FIG. 12 shows a cross sectional view of a part of a rotary pump according to the tenth embodiment.

A resin element 100q is provided on an opposite side of the resin element 80b, 81b with respect to the resin element 100b and, also, a resin element 101q is provided on an opposite side of the resin element 80b, 81b with respect to the resin element 101b. The respective resin elements 100q and 101q are provided separately from the resin elements 100b and 101b only at the places where the resin elements 80b and 81b are arranged.

Each width of the grooved portions 71b and 72b is wider only at the places where the resin element 100q and 101q are arranged and the resin element 100q and 101q are housed in the spaces where the grooved portions 71b and 72b are wider.

The resin element 100q, 101q is shaped as shown by a dot line in the drawing so that a sum of thickness of the resign element 100q, 101q and the resin element 100b, 101b is larger than a depth of the grooved portion 71a, 72b before the pump is assembled.

On assembling the pump, both of the resin element 100q, 101q and the resign element 80b, 81b are loaded so as to be compressed and deformed so that the resin elements 100b and 101b may be firmly in contact with the resign element 80b, 81b and also in contact with the center plate 73. The tenth embodiment has similar function and effect as disclosed in the eight embodiment.

Figure 13:
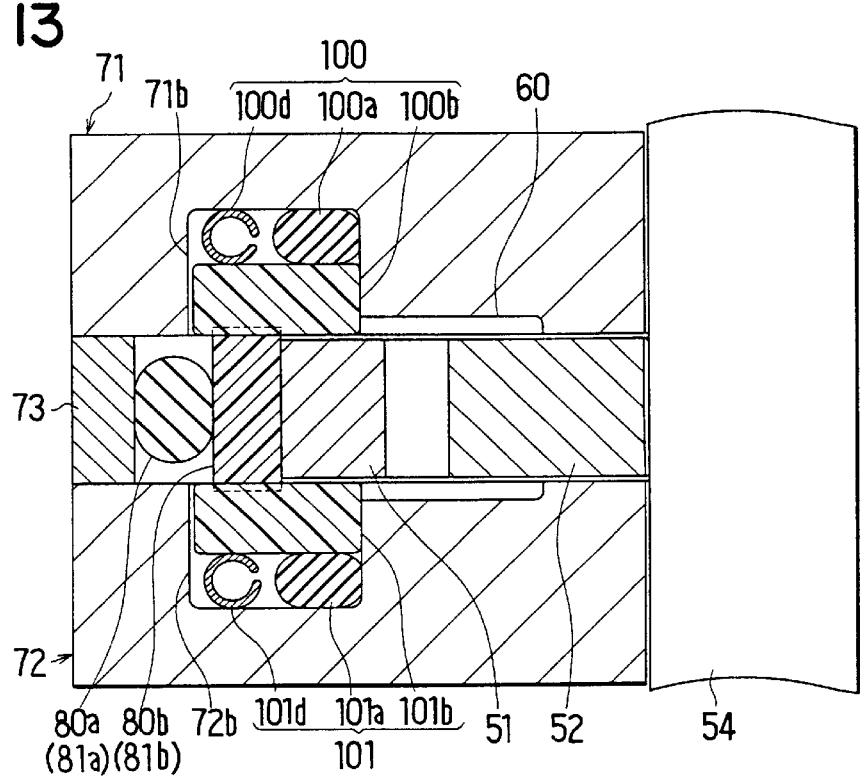
FIG. 13 is a cross sectional view of a part of a rotary pump according to an eleventh embodiment.

An eleventh embodiment of the present invention is described with reference to FIG. 13. FIG. 13 shows a cross sectional view of a part of a rotary pump according to the eleventh embodiment.

According to the eleventh embodiment, metal springs 100d and 101d are provided in place of the resin elements 100q and 101q in the tenth embodiment. The resin element 80b, 81b is put between and loaded by the resin elements 100b and 101b based on the elastic forces of the metal springs 100d and 101d. The eleventh embodiment has similar function and effect as disclosed in the eighth embodiment.

Figure 14:
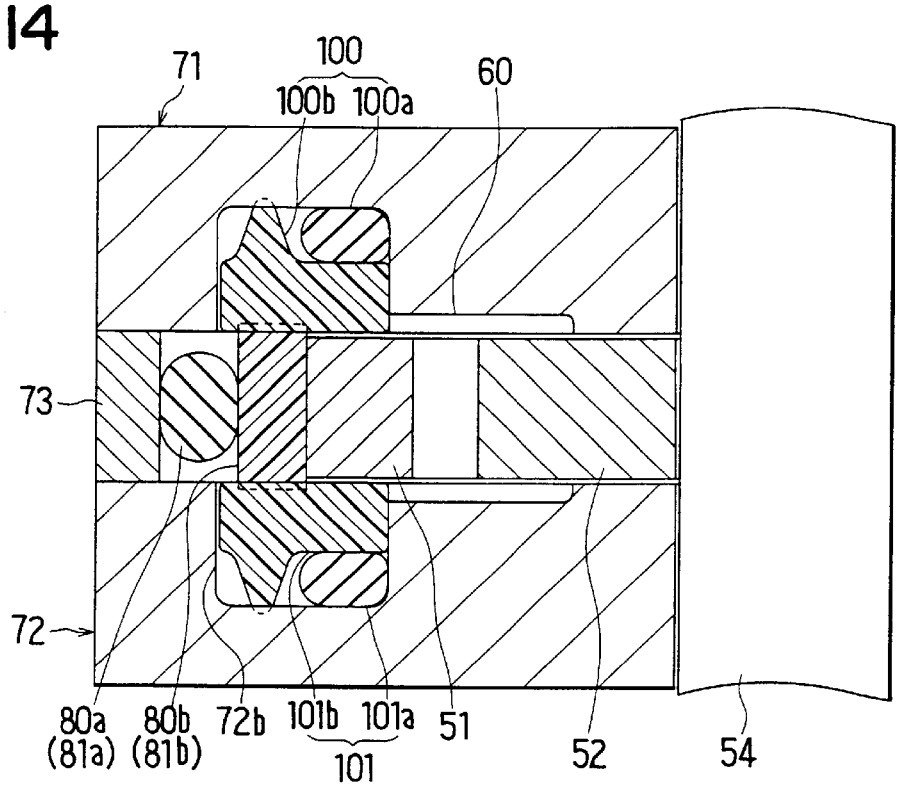
FIG. 14 is a cross sectional view of a part of a rotary pump according to an twelfth embodiment.

A twelfth embodiment of the present invention is described with reference to FIG. 14. FIG. 14 shows a cross sectional view of a part of a rotary pump according to the twelfth embodiment.

According to the twelfth embodiment, the resin element 100b, 101b is integrally provided with partly projecting portions in place of the resin elements 100q, 101q separately provided from the resin element 100b, 101b in the ninth embodiment. The resin element 80b, 81b is put between and loaded by the resin elements 100b and 101b in such a manner that a portion shown by a dot line in the drawing of the respective partly projecting portions is compressed and deformed on assembling the pump. The partly projecting portions play the same role as the resin elements 100q, 101q. The twelfth embodiment has similar function and effect as disclosed in the eighth embodiment.

Figure 15:
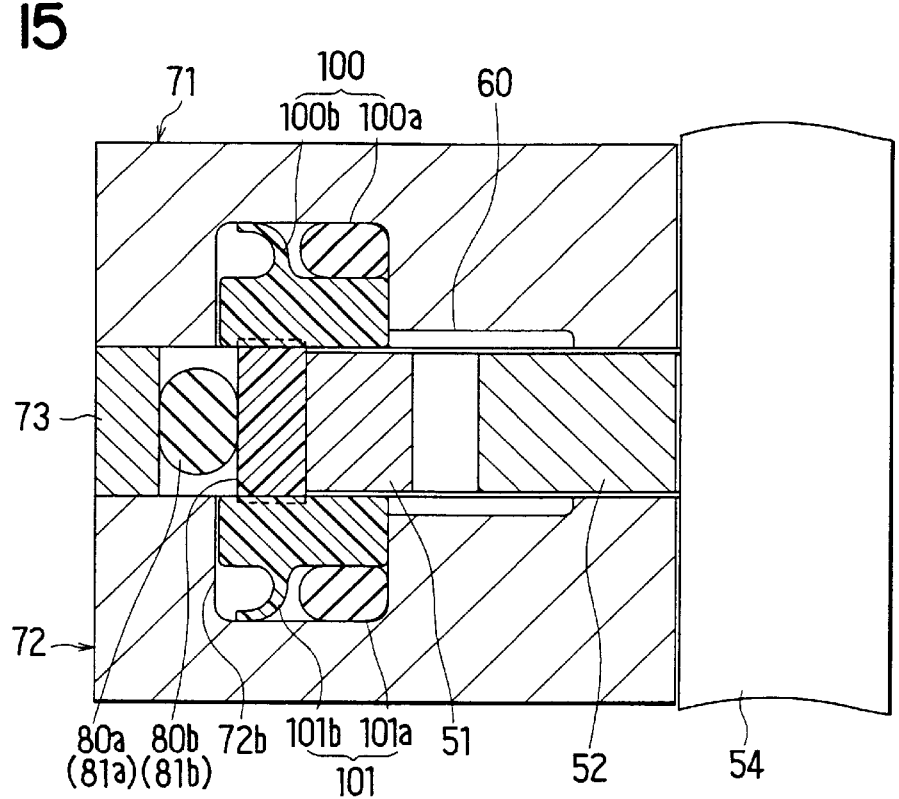
FIG. 15 is a cross sectional view of a part of a rotary pump according to a thirteenth embodiment.

A thirteenth embodiment of the present invention is described with reference to FIG. 15. FIG. 15 shows a cross sectional view of a part of a rotary pump according to the thirteenth embodiment. According to the thirteenth embodiment, the resin element 100b, 101b is provided with partly projecting elastic portions in place of the partly projecting portions to be compressed and deformed in the twelfth embodiment.

The resin element 80b, 81b is put between and loaded by the resin elements 100b and 101b in such a manner that the partly projecting elastic portions are bent and produce the elastic force on assembling the pump. The thirteenth embodiment has similar function and effect as disclosed in the eighth embodiment.

Figure 16:
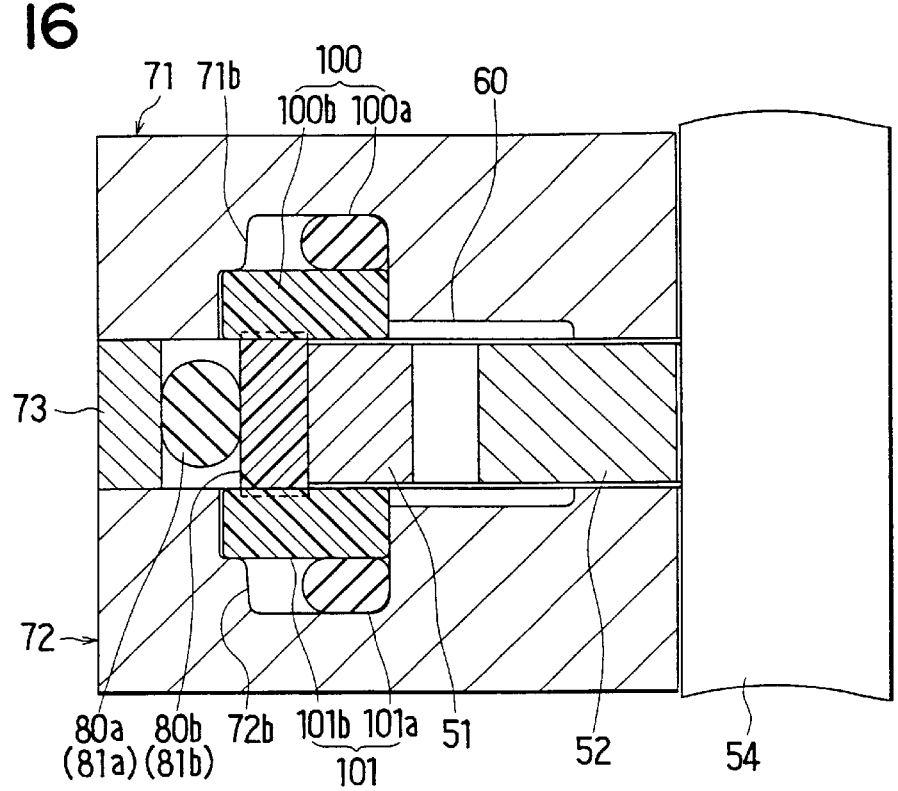
FIG. 16 is a cross sectional view of a part of a rotary pump according to a fourteenth embodiment.

A fourteenth embodiment of the present invention is described with reference to FIG. 16. FIG. 16 shows a cross sectional view of a part of a rotary pump according to the fourteenth embodiment.

According to the fourteenth embodiment, the grooved portion 71b, 72b is provided with step portions in place of the resin elements 100q and 101q in the tenth embodiment. The step portions are respectively provided in a depth that is slightly thinner than the thickness of the resin element 100b, 101b and only at the places where the resin elements 80b and 81b are arranged. Therefore, the width of the grooved portion 71b, 72b at each position of the step portions is partly narrowed. The resin element 80b, 81b is put between and loaded by the resin elements 100b and 101b pressed partly due to the step portions on assembling the pump. The fourteenth embodiment has similar function and effect as disclosed in the eighth embodiment.

Figure 17:
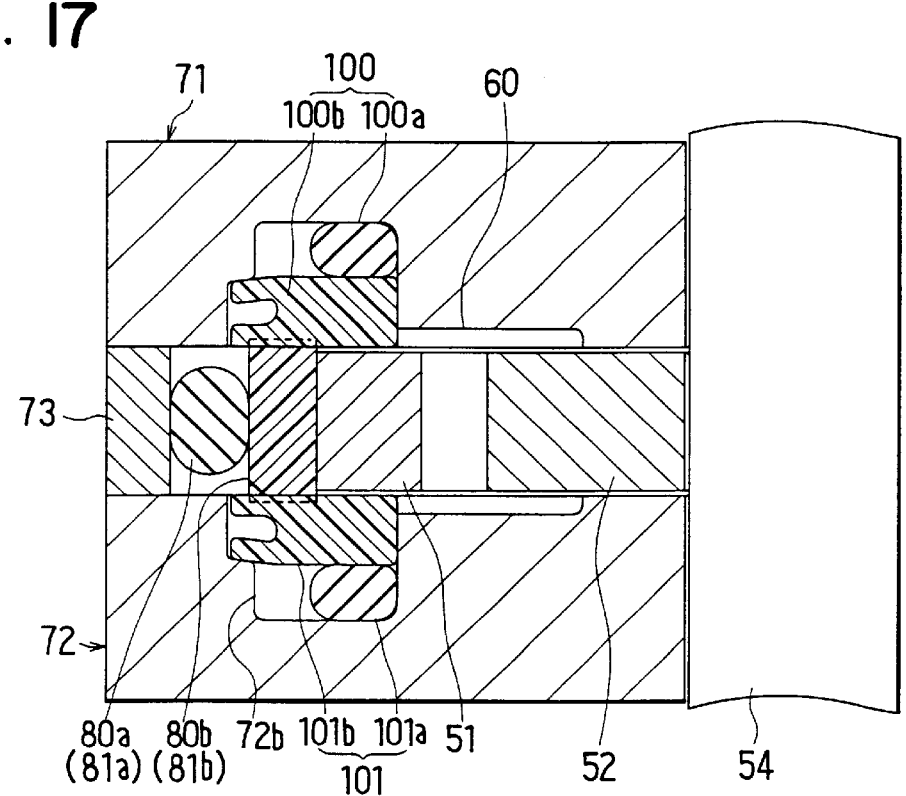
FIG. 17 is a cross sectional view of a part of a rotary pump according to a fifteenth embodiment.

A fifteenth embodiment of the present invention is described with reference to FIG. 17. FIG. 17 shows a cross sectional view of a part of a rotary pump according to the fifteenth embodiment.

According to the fifteenth embodiment, the grooved portion 71b, 72b is provided with step portions described in the fourteenth embodiment and, further, the resin element 100b, 101b is provided with notched portions for exerting spring force of the resin element 100b, 101b itself. The spring force of the resin elements 100b and 101b based on the notched portions loads the resin element 80b, 81b put between the resin elements 100b and 101b. The fifteenth embodiment has similar function and effect as disclosed in the eighth embodiment.

Figure 18:
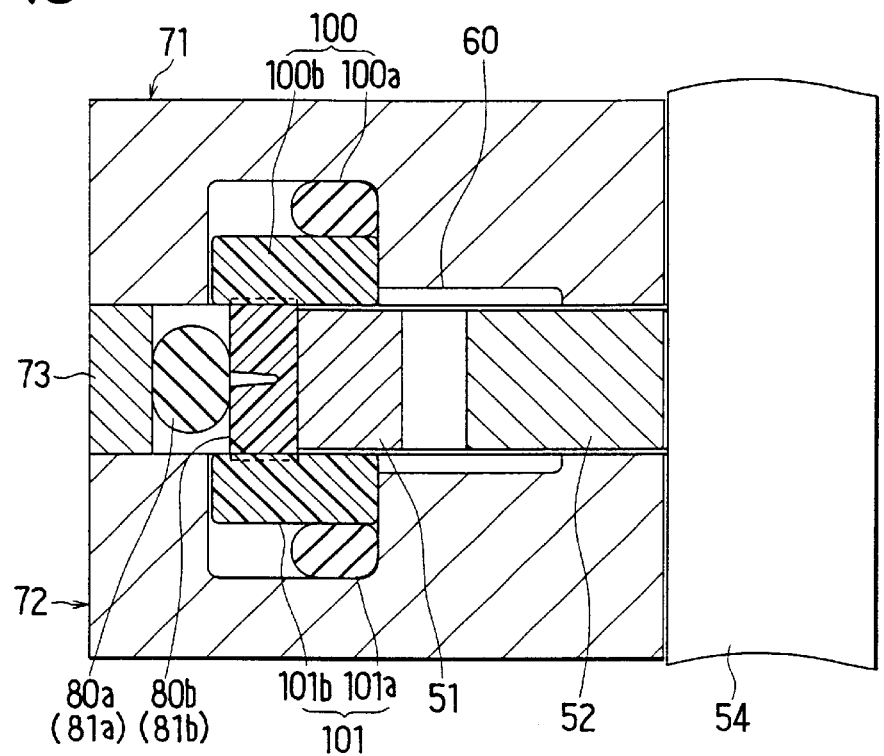
FIG. 18 is a cross sectional view of a part of a rotary pump according to a sixteenth embodiment.

A sixteenth embodiment of the present invention is described with reference to FIG. 18. FIG. 18 shows a cross sectional view of a part of a rotary pump according to the sixteenth embodiment.

Though a variety of structures of the transverse sealing member 100, 101 are described for deforming the resin element 80b, 81b in the axial direction of the drive shaft 54 according to the eighth to fifteenth embodiments, the resign element 80b, 81b is further provided with a notched portion for easing the deformation of the resin element 80, 81b itself in the axial direction of the drive shaft 54 according to the sixteenth embodiment.

The resin element 80b, 81b, the thickness of which is larger than that of the center plate 73, can be easily deformed by means of the notched portions on assembling the pump so that the resin elements 100b and 101b may be securely in contact with the resin element 80b, 81b and, also, in contact with the center plate 73. The sixteenth embodiment has similar function and effect as disclosed in the eighth embodiment.

Figure 19:
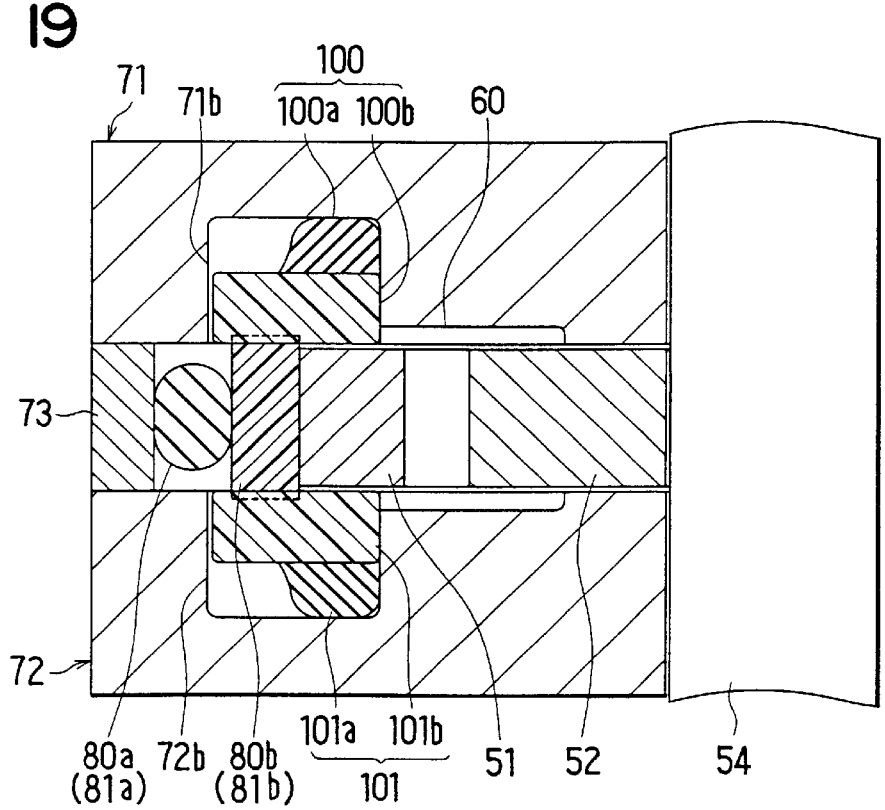
FIG. 19 is a cross sectional view of a part of a rotary pump according to a seventeenth embodiment.

A seventeenth embodiment of the present invention is described with reference to FIG. 19. FIG. 19 shows a cross sectional view of a part of a rotary pump according to the seventeenth embodiment.

According to the seventeenth embodiment, the elastic element 100a, 101a described in the eighth embodiment is fitted to the resin element 100b, 101b by bonding and the like in advance before the pump is assembled.

An integrated unit of the elastic element 100a, 101a and the resin element 100b, 101b can be easily assembled in the grooved portion 71b, 72b. The seventeenth embodiment has similar function and effect as disclosed in the eighth embodiment.

Figure 20:
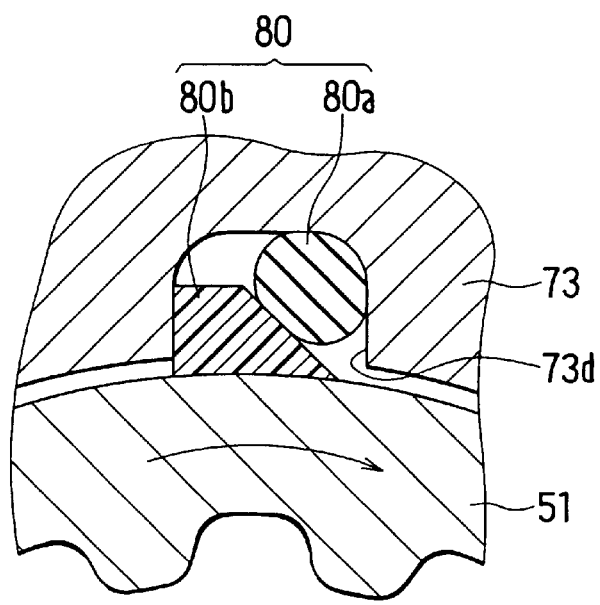
FIG. 20 is a partly enlarged cross sectional view of a rotary pump at a vicinity of a lateral sealing member according to an eighteenth embodiment.

A eighteenth embodiment of the present invention is described with reference to FIG. 20. FIG. 20 shows a partly enlarged cross sectional view of a rotary pump at a vicinity of a lateral sealing member 80 according to the eighteenth embodiment. With respect to the lateral sealing member 81 similar to the lateral sealing member 80, the explanation is omitted.

The lateral sealing member 80 is composed of an elastic element 80a and a resin element 80b. The resin element 80b has a tapered surface at a corner on a bottom side of the recessed portion 73d. In more detail, the outer circumference of the outer rotor 51 communicating with the intake port 60 on a left side of the lateral sealing member 80 in the drawing is exposed to low pressure and the outer circumference of the outer rotor 51 communicating with the discharge port 61 on a right side of the lateral sealing member 80 in the drawing is exposed to high pressure. The corner of the resin element 80b on the high pressure side is cut off to form the tapered surface. The elastic element 80a is arranged between the tapered surface and the recessed portion 73d.

The resin element 80b is not only pressed toward the outer circumference of the outer rotor 51 but also brought in closed contact with an inner wall of the recessed portion 73d on the low pressure side by elastic force of the elastic member 80a.

Figure 21:
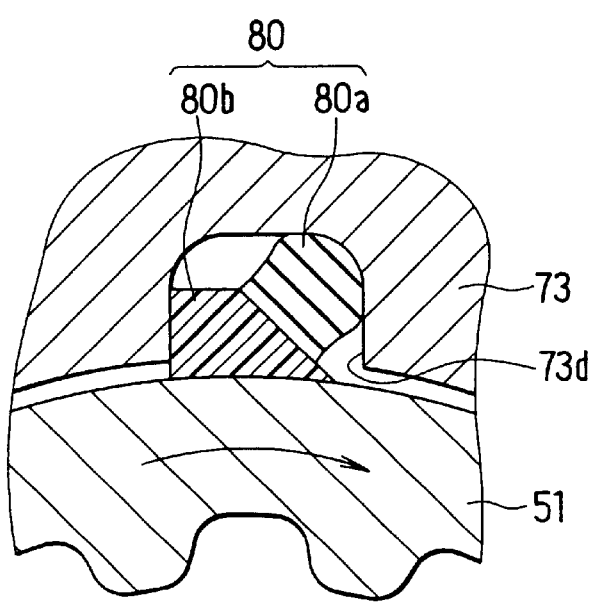
FIG. 21 is a partly enlarged cross sectional view of a rotary pump at a vicinity of a lateral sealing member according to an nineteenth embodiment.

A nineteenth embodiment of the present invention is described with reference to FIG. 21. FIG. 21 shows a partly enlarged cross sectional view of a rotary pump at a vicinity of a lateral sealing member 80 according to the nineteenth embodiment. With respect to the lateral sealing member 81 similar to the lateral sealing member 80, the explanation is omitted.

The lateral sealing member 80 is composed of an elastic element 80a and a resin element 80b. The resin member 80b is provided with the tapered portion as disclosed in the eighteenth embodiment. The elastic element 80a is provided with a flat surface to be in contact with the tapered surface of the resin element 80b. The resin element 80b and the elastic element 80a are integrated by bonding with adhesive and the like the flat surface of the elastic element 80a to the tapered surface of the resin element 80b, which improves the productivity on assembling the lateral sealing member 80 to the recessed portion 73d.

Figure 22:
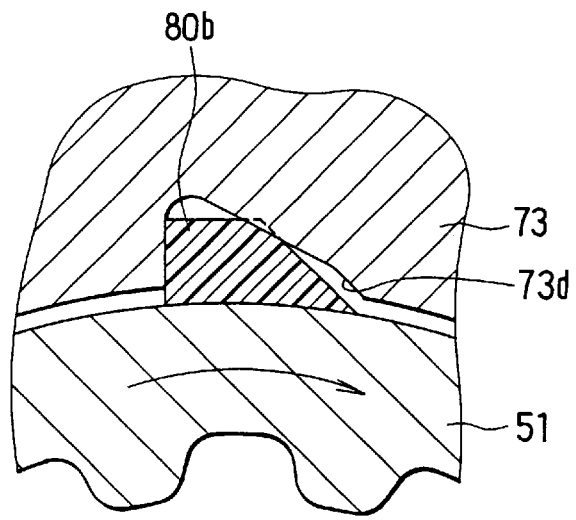
FIG. 22 is a partly enlarged cross sectional view of a rotary pump at a vicinity of a lateral sealing member according to a twentieth embodiment.

A twentieth embodiment of the present invention is described with reference to FIG. 22. FIG. 22 shows a partly enlarged cross sectional view of a rotary pump at a vicinity of a lateral sealing member 80 according to the twentieth embodiment. With respect to the lateral sealing member 81 similar to the lateral sealing member 80, the explanation is omitted.

According to the twentieth embodiment, the tapered surface of the resin element 80b is pressed by a tapered surface of the recessed portion 73d in place of the elastic element 80a shown in the eighteenth embodiment.

In more detail, the recessed portion 73d is provided with a tapered portion at a place thereof facing the tapered portion of the resin element 80b. The tapered portion of the recessed portion 73d presses to deform only a part of the tapered portion of the resin element 80b as shown by a dot-line in the drawing. The resin element 80b can be pushed in the same direction as described in the eighteenth embodiment.

Figure 23:
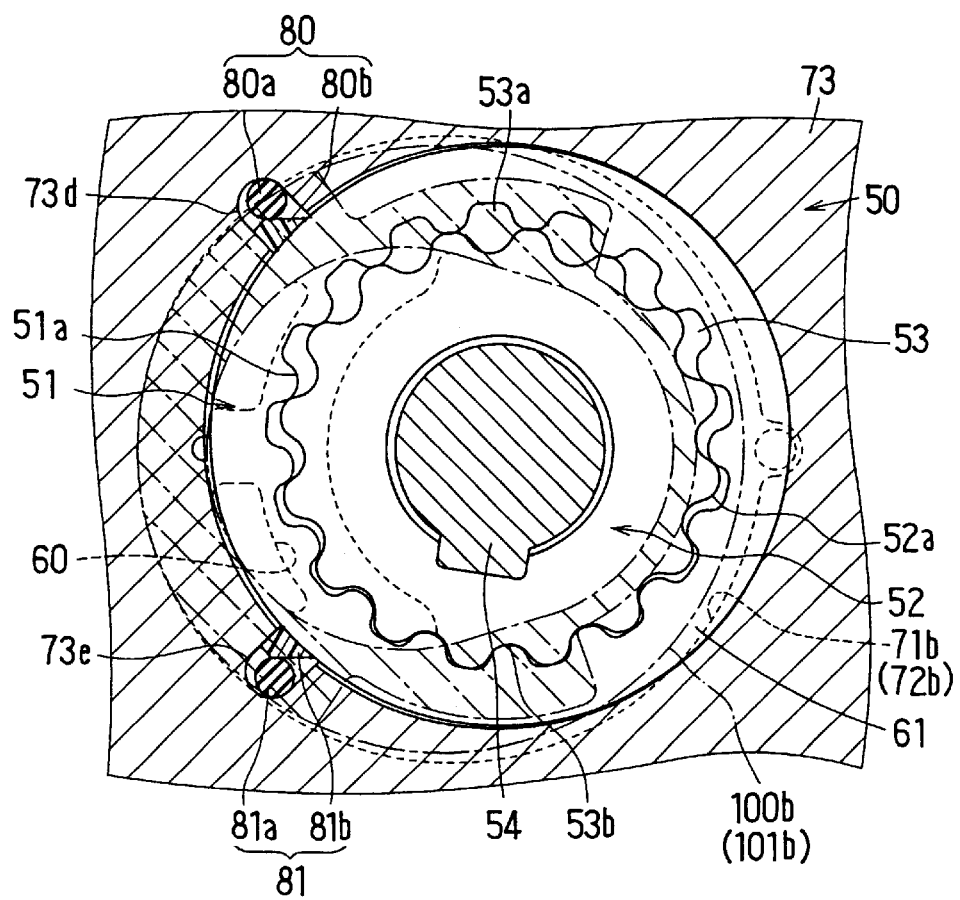
FIG. 23 is a sectional view of a rotary pump according to a twenty-first embodiment.

A twenty-first embodiment of the present invention is described with reference to FIG. 23. FIG. 23 shows a cross sectional view of a rotary pump according to the twenty-first embodiment, which is a modification of the fifth embodiment.

According to the twenty-first embodiment, the resin element 100b, 101b is in contact with the outer and inner rotors 51 and 52 not only around each one of the teeth gap portions within the first and second closed regions 53a and 53b, as shown in the fifth embodiment, but also around each one of the adjacent teeth gap portions within the first and second closed regions 53a and 53b. That is, a dot-dash slanting line portion of the resin element 100b, 101b is more expanded, compared with that of the fifth embodiment, so that at least two teeth gap portions 53 within the respective first and second closed regions 53a and 53b are sealed by the resin element 100b, 101b. Further, the outer and inner rotors 52 and 51 are so arranged that brake fluid in the two teeth gap portions within the first and second closed regions is compressed. Therefore, the twenty-first embodiment has similar function and effect as disclosed in the fifth embodiment.

The respective designed locations of the maximum and minimum volume teeth portions are likely to vary due to the dimensional errors of the outer and inner teeth 52a and 51a and other manufacturing errors of the component parts of the rotary pump. Therefore, the width of the resin element 100b, 101b is partly wider to seal at least two teeth gap portions within the first and second closed regions 53a and 53b so that the brake fluid leakage may be always prevented, even if the contact points where the inner and outer teeth portions 51a and 52a are meshed with each other at vicinities of the first and second closed regions are deviated due to the manufacturing error.

Though the transverse sealing member 100, 101 is shaped a ring in the embodiments mentioned above, the transverse sealing member 100, 101 may have the other shape as far as the other shape covers the region from the circumference of the outer rotor 51 via the first closed region 53a, a portion between the drive shaft 54 and the discharge port 61 and the second closed region 53b to the other circumference of the outer rotor 51. However, the portions that are not required inherently to be sealed, such as teeth gap portions 53 and the outer circumference of the outer rotor 51 on the intake and discharge port sides which are communicated with the intake and discharge ports 60 and 61, respectively, should be in minimum contact with the transverse sealing member in order to diminish the contact resistance.

Figure 24:
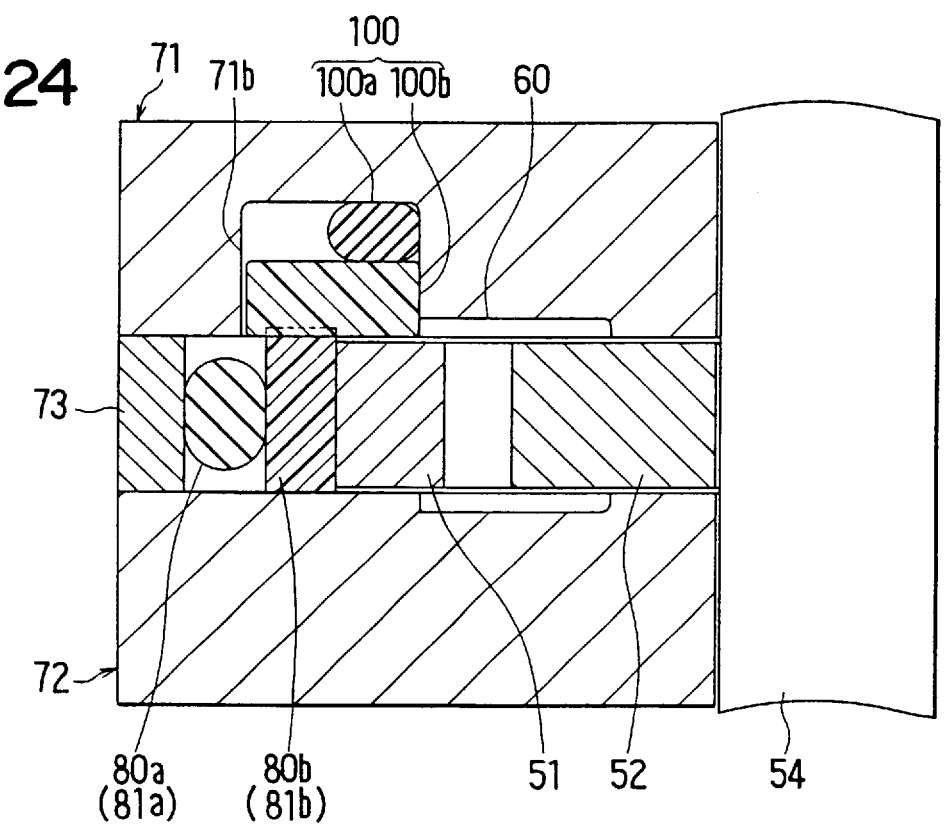
FIG. 24 is a cross sectional view of a part of a rotary pump according to a twenty-second embodiment.

Though the transverse sealing members 100 and 101 are arranged respectively on both axial end surface sides of the inner and outer rotors 52 and 51 in the embodiment mentioned above, according to a twenty-second embodiment, the transverse sealing member 100 may be arranged only on one axial end surface side of the inner and outer rotors 52 and 51, that is, only in the groove 71b of the first side plate 71, as shown in FIG. 24. The resin element 100b biased by the elastic element 100a presses the resin element 80b of the lateral sealing member 80 so as to be in contact with the one axial end surface side of the inner and outer rotors 52 and 51. As a result, the inner and outer rotors 52 and 51 are also pushed toward the second plate 72 so that a clearance between the inner and outer rotors 52 and 51 and the second side plate 72 may be diminished and, for example, becomes several microns. Therefor, compared with the eight embodiment of FIG. 10 where both the transverse sealing members 100 and 101 are employed, the similar sealing effect may be secured, while an axial shifting between the inner and outer rotors 52 and 51 may be prevented.

What is claimed is:

1. A brake apparatus having a rotary pump for supplying brake fluid to a wheel cylinder to make brake fluid pressure at the wheel cylinder higher than brake fluid pressure at a master cylinder, the rotary pump comprising:

an outer rotor provided with inner teeth at an inner circumference thereof;

an inner rotor provided with outer teeth at an outer circumference thereof, the outer teeth being in mesh with the inner teeth so as to constitute a plurality of teeth gap portions therebetween;

a drive shaft fitted to the inner rotor with a clearance between the drive shaft and the inner rotor for rotating the inner rotor together with the drive shaft;

a casing provided with a rotor room where the inner and outer rotors are rotatably contained, a center bore communicating with the rotor room in which the drive shaft is rotatably housed and intake and discharge ports communicating respectively with the teeth gap portions, the rotor room being provided, between the intake and discharge ports, with a first closed region on a side of the teeth gap portion whose volume is largest and a second closed region on a side of the teeth gap portion whose volume is smallest and each of the first and second closed region being operative for holding brake fluid pressure difference between the intake and discharge ports, wherein brake fluid is sucked from the intake port, being compressed through the teeth gap portions and discharged from the discharge port when the drive shaft is driven; and a transverse sealing member provided at a transverse clearance between the casing and the axial end surfaces of the inner and outer rotors, the transverse sealing member extending from an outer circumference of the outer rotor, via the first closed region, the inner rotor between the drive shaft and the discharge port and the second closed region, to another outer circumference of the outer rotor so that brake fluid communication through the transverse clearance from the discharge port to the intake port is prevented, but the brake fluid communication through the transverse clearance between the outer circumference of the outer rotor and almost all of the teeth gap portions on a side of the discharge port and, further, between almost all of the teeth gap portions on a side of the intake port and the clearance between the drive shaft and the inner rotor is allowed.

2. A brake apparatus according to claim 1, wherein brake fluid communication through the transverse clearance between the outer circumference of the outer rotor and at least one of the teeth gap portions on the side of the intake port is allowed.

3. A brake apparatus according to claim 1, wherein the casing is comprised of first and second side plates having respective center bores in which the drive shaft is housed and a center plate having a bore where the inner and outer rotor are contained, the center plate being put between the first and second plates for constituting the rotor room, wherein at least one of the first and second side plates is provided with a grooved portion extending from the outer circumference of the outer rotor, via the first closed region, the inner rotor between the drive shaft and the discharge port and the second closed region, to the other circumference of the outer rotor and the transverse sealing member is housed in the at least one of the grooved portions.

4. A brake apparatus according to claim 3, wherein the transverse sealing member is comprised of a first element made of elastic material and arranged on a bottom side of the grooved portion and a second element arranged on an opening side of the grooved portion, the second element being in contact with the inner and outer rotor by means of elastic force of the first element.

5. A brake apparatus according to claim 4, wherein an area of a surface of the second element actually in contact with the inner rotor is smaller than that of a surface thereof being pressed by the first element.

6. A brake apparatus according to claim 5, wherein the surface of the second element in contact with the inner and outer rotors is provided with a step portion where the surface of the second element is stepped.

7. A brake apparatus according to claim 6, wherein the second element, at least around one of the respective teeth gap portions within the first and second closed regions, is in contact with the outer and inner rotors and, between the drive shaft and almost all of the teeth gap portions on the side of the discharge port, is in contact with the inner rotor and hangs over the teeth gap portions with a clearance between the step portion and the teeth gap portions in a direction perpendicular to the drive shaft so that the almost all of the teeth gap portions communicated with the discharge port may communicate with the outer circumference of the outer rotor on the side of the discharge port.

8. A brake apparatus according to claim 5, wherein a width length of the surface of the second element actually in contact with the inner rotor which overlaps in a width direction of the grooved portion with the first element is equal to a width length of the surface of the second element actually in contact with the inner rotor which does not overlap in a width direction of the grooved portion with the first element.

9. A brake apparatus according to claim 4, wherein the second element is in contact with the inner and outer rotors so as to seal at least one of the teeth gap portions within the respective first and second closed regions.

10. A brake apparatus according to claim 4, wherein the second element is in contact with the inner and outer rotors so as to seal at least two of the teeth gap portions within the respective first and second closed regions.

11. A brake apparatus according to claim 9, wherein the inner and outer rotors are so in mesh that brake fluid in the teeth gap portion within the first closed region is compressed.

12. A brake apparatus according to claim 10, wherein the inner and outer rotors are so in mesh that brake fluid in at least two of the teeth gap portions within the first closed region is compressed.

13. A brake apparatus according to claim 4, wherein the second element has a wide spread portion in contact with the inner and outer rotors so as to overlap a part of the teeth gap portions on a side of at least one of the intake and discharge ports for preventing mutual axial shifting movements of the inner and outer rotors, the wide spread portion being provided at the place other than the places where the first and second closed regions are located.

14. A brake apparatus according to claim 13, wherein the second element has a plurality of wide spread portions, the locations of which are nearly symmetrical to each other with respect to the drive shaft.

15. A brake apparatus according to claim 13, wherein the wide spread portion has an opening through which the teeth gap portion overlapped by the wide spread portion communicates with the outer circumference of the outer rotor.

16. A brake apparatus according to claim 4, wherein the at least one of the grooved portions is shaped a ring that is off-centered with respect to an axis of the drive shaft, the first element is an o-ring and the second element is a resin ring.

17. A brake apparatus according to claim 3, wherein an inner wall of the bore of the center plate facing the outer circumference of the outer rotor is provided with two recessed portions, one of which is located between the respective outer circumferences of the outer rotor on intake and discharge port sides on a side of the first closed region and the other of which is located between the respective outer circumferences of the outer rotor on intake and discharge port sides on a side of the second closed region, and a lateral sealing member is housed in each of the recessed portions for preventing brake fluid communication from the discharge port side to the intake port side in the outer circumference of the outer rotor.

18. A brake apparatus according to claim 17, wherein the two recessed portions are located on the intake port side with respect to a hypothetical line connecting the respective centers of the first and second closed regions.

19. A brake apparatus according to claim 17, wherein the lateral sealing member overlaps with the transverse sealing member in a direction perpendicular to the drive shaft.

20. A brake apparatus according to claim 17, wherein the lateral sealing member is comprised of an elastic element arranged on a bottom side of the recessed portion and a resin element on an opening side of the recessed portion, a length of the resin element in an axial direction of the drive shaft is larger than the thickness of the center plate before the resin element is put between and loaded by the transverse sealing members.

21. A brake apparatus according to claim 17, wherein the lateral sealing member is comprised of a resin element having a tapered surface at a corner thereof on a bottom side of the recessed portion and on the discharge port side, and an elastic element arranged between the tapered surface and the recessed portion.

22. A brake apparatus according to claim 20, wherein each of the transverse sealing member is comprised of a first element provided on a bottom side of the grooved portion and made of an o-ring having projections only at the places where the lateral sealing members are arranged and a second element provided on an opening side of the grooved portion to be in contact with the lateral sealing member and the inner and outer rotors due to elastic force of the o-ring, each thickness of the projections is larger than that of the other part of the o-ring in an axial direction of the drive shaft before loading the resin element.

23. A brake apparatus according to claim 20, wherein each of the transverse sealing member is comprised of a first element made of an o-ring provided on a bottom side of the grooved portion, a second element provided on an opening side of the grooved portion to be in contact with the lateral sealing member and the inner and outer rotors due to elastic force of the o-ring and a third element provided beside the o-ring only at the place where the lateral sealing member is arranged for firmly loading the resin element.

24. A brake apparatus according to claim 20, wherein each of the transverse sealing member is comprised of a first element made of an o-ring provided on a bottom side of the grooved portion and a second element provided on an opening side of the grooved portion to be in contact with the lateral sealing member and the inner and outer rotors due to elastic force of the o-ring, the second element having partly projecting portions only at the places where the lateral sealing members are arranged for firmly loading the resin element.

25. A brake apparatus having a rotary pump for supplying brake fluid to a wheel cylinder to make brake fluid pressure at the wheel cylinder higher than brake fluid pressure at a master cylinder, the rotary pump comprising:

an outer rotor provided with inner teeth at an inner circumference thereof;

an inner rotor provided with outer teeth at an outer circumference thereof, the outer teeth being in mesh with the inner teeth so as to constitute a plurality of teeth gap portions therebetween;

a drive shaft fitted to the inner rotor with a clearance between the drive shaft and the inner rotor for rotating the inner rotor together with the drive shaft; and a casing provided with a rotor room where the inner and outer rotors are rotatably contained, a center bore communicating with the rotor room in which the drive shaft is rotatably housed and intake and discharge ports communicating respectively with the teeth gap portions, the rotor room being provided with a first closed region on a side of the teeth gap portion whose volume is largest and a second closed region on a side of the teeth gap portion whose volume is smallest and each of the first and second closed regions being operative for holding brake fluid pressure difference between the intake and discharge ports, wherein brake fluid is sucked from the intake port, being compressed through the teeth gap portions and discharged from the discharge port when the drive shaft is driven;

wherein the casing is comprised of first and second side plates having respective center bores in which the drive shaft is housed and a center plate having a bore where the inner and outer rotor are contained, the center plate being put between the first and second plates for constituting the rotor room; and further wherein an inner wall of the bore of the center plate facing the outer circumference of the outer rotor is provided with two recessed portions and a lateral sealing member is housed in each of the recessed portions for preventing brake fluid communication from the discharge port side to the intake port side in the outer circumference of the outer rotor, the lateral sealing member having a portion whose length in an axial direction of the drive shaft being larger than the thickness of the center plate before the lateral sealing member is put between and loaded by the first and second side plates.

26. A brake apparatus according to claim 1, further comprising:

a brake fluid pressure generating device for generating fluid pressure in accordance with depression force;

a braking force producing device for producing braking force on wheels; and a conduit line provided with a main conduit and a auxiliary conduit, the main conduit being connected to the brake fluid pressure generating device for transmitting brake fluid to the braking force producing device and the auxiliary conduit being also connected to the brake fluid pressure generating device for supplying additional brake fluid to the main conduit in order to increase the braking force to be produced by the braking force producing device;

wherein the rotary pump is disposed in the auxiliary conduit, the intake port facing to the brake fluid pressure generating device and the discharge port facing to the first braking force producing device.

* * * * *